(12) United States Patent
Marumoto et al.

(10) Patent No.: US 11,629,633 B2
(45) Date of Patent: Apr. 18, 2023

(54) ENGINE INTAKE SYSTEM

(71) Applicant: Mazda Motor Corporation, Hiroshima (JP)

(72) Inventors: Masaharu Marumoto, Aki-gun (JP); Kazuaki Narahara, Aki-gun (JP); Chinami Morishima, Aki-gun (JP); Tohru Hokazono, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/864,752

(22) Filed: Jul. 14, 2022

(65) Prior Publication Data

US 2023/0021893 A1 Jan. 26, 2023

(30) Foreign Application Priority Data

Jul. 26, 2021 (JP) .............................. JP2021-121932

(51) Int. Cl.
*F02B 29/04* (2006.01)
*F02M 31/20* (2006.01)
*B60H 1/32* (2006.01)
*B60H 1/00* (2006.01)

(52) U.S. Cl.
CPC ......... *F02B 29/04* (2013.01); *B60H 1/00028* (2013.01); *B60H 1/3208* (2013.01); *B60H 1/3227* (2013.01); *F02B 29/0418* (2013.01); *F02B 29/0475* (2013.01); *F02M 31/20* (2013.01); *F02M 31/205* (2013.01)

(58) Field of Classification Search
CPC ...... F02M 31/20; F02M 31/205; F02M 35/08; F02B 29/0412; F02B 29/04; F02B 29/0418; F02B 29/0475

USPC .................................................. 123/542, 563
See application file for complete search history.

(56) References Cited

U.S. PATENT DOCUMENTS 4,207,848 A * 6/1980 Dinger ................ F02B 29/0412
60/599
4,480,439 A * 11/1984 Yamane ............. F02B 29/0443
60/599

(Continued)

FOREIGN PATENT DOCUMENTS

JP 2019100269 A 6/2019
WO WO-2015155985 A1 * 10/2015 ................ F01P 3/20

*Primary Examiner* — Sizo B Vilakazi
*Assistant Examiner* — Brian R Kirby
(74) *Attorney, Agent, or Firm* — Alleman Hall Creasman & Tuttle LLP

(57) ABSTRACT

An intake system of an engine mounted on a vehicle where a cabin is air-conditioned by an air conditioner, is provided. A heat exchanger of an evaporator of the air conditioner is divided into a first heat exchanger and a second heat exchanger that are mutually independent, and an air passage includes a first division passage and a second division passage. The intake system cools intake air utilizing a part of the air conditioner, and includes a connecting passage that guides first air cooled by passing through the first heat exchanger, a passage switch, and a controller. When the controller determines that a cooling demand for the intake air exists, it controls the first air to flow into an intake passage through the connecting passage, and when the controller determines that there is no cooling demand, it controls the first air to flow into the first division passage.

20 Claims, 13 Drawing Sheets

(56) References Cited

U.S. PATENT DOCUMENTS

| | | | | |
|---|---|---|---|---|
| 6,314,949 B1* | 11/2001 | DeGrazia, Jr. | F02B 29/0493 | 123/542 |
| 6,796,134 B1* | 9/2004 | Bucknell | B60H 1/323 | 62/133 |
| 7,658,183 B1* | 2/2010 | Johnson | F02M 31/20 | 123/541 |
| 7,779,821 B2* | 8/2010 | Noyama | F02B 29/0412 | 123/542 |
| 8,733,327 B2* | 5/2014 | Diem | F28F 9/26 | 123/542 |
| 8,955,497 B2* | 2/2015 | Ino | F02M 35/10052 | 123/542 |
| 9,103,268 B2* | 8/2015 | Mueller | F02B 29/0418 | |
| 9,359,936 B2* | 6/2016 | Brinkmann | F02B 29/0443 | |
| 9,551,273 B2* | 1/2017 | Iwasaki | F02B 29/0462 | |
| 9,677,517 B2* | 6/2017 | Roten | B60K 13/02 | |
| 10,934,982 B1* | 3/2021 | Tan | F01P 3/12 | |
| 11,124,047 B2* | 9/2021 | Vehige | B60H 1/04 | |
| 2008/0087402 A1* | 4/2008 | Burk | F02M 35/10222 | 165/101 |
| 2009/0145409 A1* | 6/2009 | Noyama | F28D 1/0461 | 165/104.11 |
| 2014/0090609 A1* | 4/2014 | Tsai | F01P 7/14 | 123/540 |

* cited by examiner

ENGINE INTAKE SYSTEM

TECHNICAL FIELD

The disclosed technology relates to an intake system of an engine, which is mounted on a vehicle in which a cabin is air-conditioned by an air conditioner, and supplies air to a combustion chamber through an intake passage.

BACKGROUND OF THE DISCLOSURE

In recent years, electrically-powered vehicles, such as electric vehicles, which are propelled using electricity, have increased. However, electrically-powered vehicles have many practical problems. Under the present circumstances, more vehicles use an engine which is an internal combustion engine as a power source, and demand for the engine is still high. Moreover, engines have room for improvement in terms of thermal efficiency, and therefore, further improvements can be expected.

One of the measures for improving the engine thermal efficiency is a reduction in the intake air temperature. JP2019-100269A discloses one of the conventional technologies related to the reduction in the intake air temperature.

In JP2019-100269A, an intake passage branches in two passages (a cooling passage and a bypass passage). An evaporator is disposed at the cooling passage, which is shared for cooling both the intake air and cabin air. The air flowing through the intake passage is cooled by heat exchange with refrigerant flowing through the evaporator.

The present inventors have been developing engines with a high compression ratio (geometric compression ratio is 18:1 or higher) in order to realize engines that excel in thermal efficiency in comparison with conventional engines. However, if the engine has a high compression ratio, abnormal combustion (such as knocking) tends to occur when the engine temperature increases. In order to suppress abnormal combustion, a control for delaying the timing of combustion (so-called "combustion retarding") is needed.

Therefore, an MBT (Minimum advance for the Best Torque) range, i.e., a range where the optimal ignition timing can be set is limited to a lower load side of the engine. Thus, there is a problem in which the improvement in the thermal efficiency is impeded even if the engine has the high compression ratio.

Therefore, the present inventors have considered a decrease in the engine temperature during operation (a low temperature shift of the engine). The low temperature shift of the engine enables it to expand the MBT range to a higher load side. The low temperature shift of the engine also has an advantage that it can reduce an energy loss accompanying an engine warm-up. Therefore, the low temperature shift of the engine is effective for the high compression ratio engine, and it is important for the improvement in thermal efficiency.

Meanwhile, one of the measures for the low temperature shift of the engine is a reduction in the intake air temperature. However, the reduction in the intake air temperature required for the low temperature shift of the engine is remarkably larger than before.

For example, when external air at about 30° C. is taken in as intake air, the temperature of the intake air rises to about 110° C. by the time it arrives at a combustion chamber because of heat received from the surrounding environment. If it is a conventional engine, it is enough to reduce the temperature of the intake air to about 95° C. On the other hand, in order to demonstrate the appropriate performance of the high compression ratio engine, the present inventors aim at controlling the temperature of the intake air introduced into the combustion chamber below 75° C. (target intake air temperature).

However, as a result of the present inventors' simulation analysis, it was found that this target intake air temperature cannot be realized by normal measures, such as heat insulation and a reduction in coolant temperature.

On the contrary, the technology of JP2019-100269A cools the intake air itself. Therefore, it is possible to cool the intake air in accordance with the target intake air temperature.

However, the technology of JP2019-100269A cools the intake air by using the evaporator which cools air inside the cabin. Therefore, the intake air cooling performance is influenced by a state of the air inside the cabin (i.e., a cooling demand of the air conditioner). For example, when the cooling demand of the air conditioner is high, if this cooling demand is prioritized, the intake air may not be cooled appropriately. On the contrary, when the cooling of the intake air is prioritized, the cooling of the air conditioner may not become sufficient.

Further, since it is necessary to provide a special passage with the evaporator to the intake passage, it becomes high in cost, and therefore, this structure is difficult to be used for practical applications. In addition, since cold storage materials are placed between a plurality of cooling fins of the evaporator, it is difficult for the air to flow therethrough. Therefore, it is disadvantageous when the intake air amount is large. The evaporator may be increased in size accordingly, but the cost increases more, and therefore the practical application becomes much more difficult.

SUMMARY OF THE DISCLOSURE

Thus, the disclosed technology appropriately achieves both cooling of the intake air and cooling of cabin air at low cost. Therefore, the engine thermal efficiency improves.

The present inventors analyzed in detail a status of use of an evaporator of the air conditioner.

As a result, the present inventors found that the cooling demand of the cabin air is high and a cooling load of the evaporator is large immediately after an engine start, but the cooling load of the evaporator became smaller after an engine warm-up, and therefore, the evaporator has capacity remaining. The disclosed technology is based on this knowledge.

According to one aspect of the present disclosure, an intake system of an engine is provided, which is mounted on a vehicle where a cabin is air-conditioned by an air conditioner and supplies intake air to a combustion chamber through an intake passage.

The air conditioner includes an air passage that guides air to the cabin, a compressor that discharges refrigerant, an evaporator that cools the air by exchanging heat with the refrigerant, and a refrigerant passage through which the refrigerant is circulated through the compressor and the evaporator. A heat exchanger of the evaporator is divided into a first heat exchanger and a second heat exchanger that are mutually independent, and the air passage includes a first division passage where the first heat exchanger is disposed, and a second division passage where the second heat exchanger is disposed.

The intake system is configured to cool the intake air utilizing part of the air conditioner. The intake system includes a connecting passage that guides first air cooled by passing through the first heat exchanger from the first division passage to the intake passage, a passage switch that switches a flow direction of the first air to the air passage or the intake passage. The intake system also includes a controller having a processor configured to execute a passage switchover controlling module that controls the passage switch, and an intake air cooling demand determining module that determines the existence of a cooling demand for the intake air based on an operating state of the engine.

When the controller determines that there is the cooling demand for the intake air, the controller controls the passage switch so that the first air flows into the intake passage through the connecting passage, and when the controller determines that there is no cooling demand for the intake air, the controller controls the passage switch so that the first air flows into the first division passage.

According to this configuration, the heat exchanger of the evaporator of the air conditioner is divided into two, and when the cooling demand for the intake air exists, the intake air is cooled by the first heat exchanger. Therefore, there is no need to separately provide a heat exchanger exclusive for the intake air cooling and a cooling passage, and thus, the intake air can be cooled at low cost and with a simple configuration.

Further, as described above, immediately after an engine start, the cooling demand of the air inside the cabin is high and the cooling load of the evaporator is large, whereas after an engine warm-up, the cooling load of the evaporator becomes smaller and the evaporator has capacity remaining. On the other hand, the cooling demand of the intake air becomes high and the effect of improving the thermal efficiency becomes higher after the engine warm-up, not immediately after the engine start.

Therefore, by utilizing the remaining capacity of the evaporator of the air conditioner, the intake air can be cooled efficiently. Both of cooling of the intake air and cooling of the cabin air can be appropriately achieved at low cost. Therefore, the engine thermal efficiency improves.

When a temperature of the engine is low, the controller may not determine the existence of the cooling demand for the intake air, and when the temperature of the engine is high, the controller may determine the existence of the cooling demand for the intake air.

When the temperature of the engine is low, although the abnormal combustion suppressing effect can be acquired by the intake air cooling, the cooling demand of the air conditioner is high. Therefore, if the intake air is also cooled at this time, both the cooling of the intake air and the cooling of the cabin may not be achieved. On the other hand, when the temperature of the engine is high, the evaporator of the air conditioner has the remaining capacity. Therefore, by utilizing the remaining capacity, both the cooling of the intake air and the cooling of the cabin air can be appropriately achieved at low cost.

The air conditioner may further be provided with a blower that sends the air toward the cabin. The intake system may further be provided with a refrigerant switch that switches the flow of the refrigerant to the first heat exchanger and the second heat exchanger. The controller may further be provided with a refrigerant switchover controlling module that is executed by the processor to control the refrigerant switch. When cooling of the cabin is demanded, the controller may activate both the blower and the compressor so that the refrigerant is supplied to both the first heat exchanger and the second heat exchanger, and when cooling of the cabin is not demanded, the controller may suspend the blower and activate the compressor so that the refrigerant is supplied only to the first heat exchanger.

That is, with this intake system, the controller performs a pre-cooling control by utilizing the divided heat exchanger. When the air conditioner is ON, the cabin can be cooled as in the conventional way, whereas, when the air conditioner is OFF, the first heat exchanger is pre-cooled. Therefore, if there is the cooling demand for the intake air, the intake air can be cooled promptly.

When an operating range of the engine is divided into three ranges in a load direction including a low-load range, a middle-load range, and a high-load range, the cooling of the intake air may not be performed in the low-load range, and the cooling of the intake air may be performed in the high-load range.

There is almost no necessity in the low-load range to suppress abnormal combustion, however, in the high-load range, the necessity of suppressing abnormal combustion is high. Therefore, by performing the intake air cooling in the high-load range without performing the intake air cooling in the low-load range, the intake air cooling can be performed efficiently, and the thermal efficiency can be improved effectively.

When the middle-load range is divided into three ranges in an engine speed direction including a low-speed range, a middle-speed range, and a high-speed range, a maximum load in a range where the cooling of the intake air is not performed in the middle-load middle-speed range may be larger than maximum loads in ranges where the cooling of the intake air is not performed in the middle-load low-speed range and the middle-load high-speed range.

In the middle-load low-speed range and the middle-load high-speed range, the fuel consumption suppressing effect acquired by suppressing abnormal combustion exceeds the fuel consumption due to the intake air cooling. On the other hand, in the middle-load middle-speed range, the fuel consumption due to the intake air cooling exceeds the fuel consumption suppressing effect which is acquired by suppressing abnormal combustion, in addition to the abnormal combustion being comparatively minor. Therefore, in the middle-load middle-speed range, the intake air cooling is not performed in its major range, and the thermal efficiency improves.

A range where the cooling of the intake air is performed in the middle-load high-speed range may be larger than a range where the cooling of the intake air is performed in the middle-load low-speed range.

Abnormal combustion occurs more easily in the middle-load high-speed range, than in the middle-load low-speed range. Therefore, in the middle-load high-speed range, the effect by the intake air cooling can be acquired higher than in the middle-load low-speed range.

A radiator unit, comprised of a radiator that cools the refrigerant by exchanging heat with air, and a radiator fan that sends the air heated by passing through the radiator rearward, may be disposed forward of the engine. The intake passage may include a given engine proximity passage disposed rearward of the radiator unit. A partition may be provided between the radiator unit and the engine proximity passage to divide therebetween. An air-guiding passage, that guides non-heated air that does not pass through the radiator into an intervening space between the partition and the engine proximity passage by blowing the non-heated air, may be provided. The air-guiding passage may be disposed so that the blown non-heated air is directed to the engine proximity passage.

Even if the temperature of the intake air itself decreases, the intake air receives heat while flowing through the intake passage, and increases in the temperature. Therefore, even if the intake air itself can be cooled, it is difficult to significantly and stably reduce the temperature of the intake air at the time of being introduced into the combustion chamber. Particularly, hot air contacts the engine proximity passage disposed rearward of the radiator unit by the radiator fan sending air.

On the other hand, in this intake system, the radiator unit and the engine proximity passage are separated by the partition so that non-heated air blows through the intervening space therebetween. Therefore, the low temperature air flows around the engine proximity passage, and the intake air flowing through the engine proximity passage can be prevented from receiving heat and increasing in temperature.

Additionally, since the air-guiding passage is disposed so that the blown non-heated air is directed to the engine proximity passage, the non-heated air does not flow along the engine proximity passage, but forms a flow containing a component which is directed to the engine proximity passage. Since the non-heated air more easily contacts the engine proximity passage, the heat reception of the intake air which flows through the engine proximity passage can be suppressed effectively.

A geometric compression ratio of the engine may be 18:1 or higher, and an upstream part of an intake port of the engine may be configured so that a thermal insulation becomes higher than at a downstream part of the intake port.

When the thermal insulation at the upstream part of the intake port is high, the intake air which flows into the intake port can be prevented from receiving heat from the surrounding environment of the intake port and increasing in temperature. On the other hand, the engine with the geometric compression ratio of 18:1 or higher, easily becomes hot during combustion, and hot mixture gas may flow into the downstream part of the intake port because of blowback from the inside of the combustion chamber. Therefore, when the thermal insulation at the downstream part of the intake port is low, the heat release thereof can be stimulated. The temperature of the intake air introduced into the combustion chamber can be reduced.

DETAILED DESCRIPTION OF THE DISCLOSURE

Hereinafter, one embodiment of the disclosed technology is described in detail with reference to the accompanying drawings. Note that the following explanation is only illustration essentially. The directions of forward and rearward, leftward and rightward, and upward and downward, which are used in the following explanation, are on the basis of a vehicle as illustrated by arrows in FIGS. 1 and 2, unless otherwise particularly described.

<Engine and Intake System>

Figure 1:
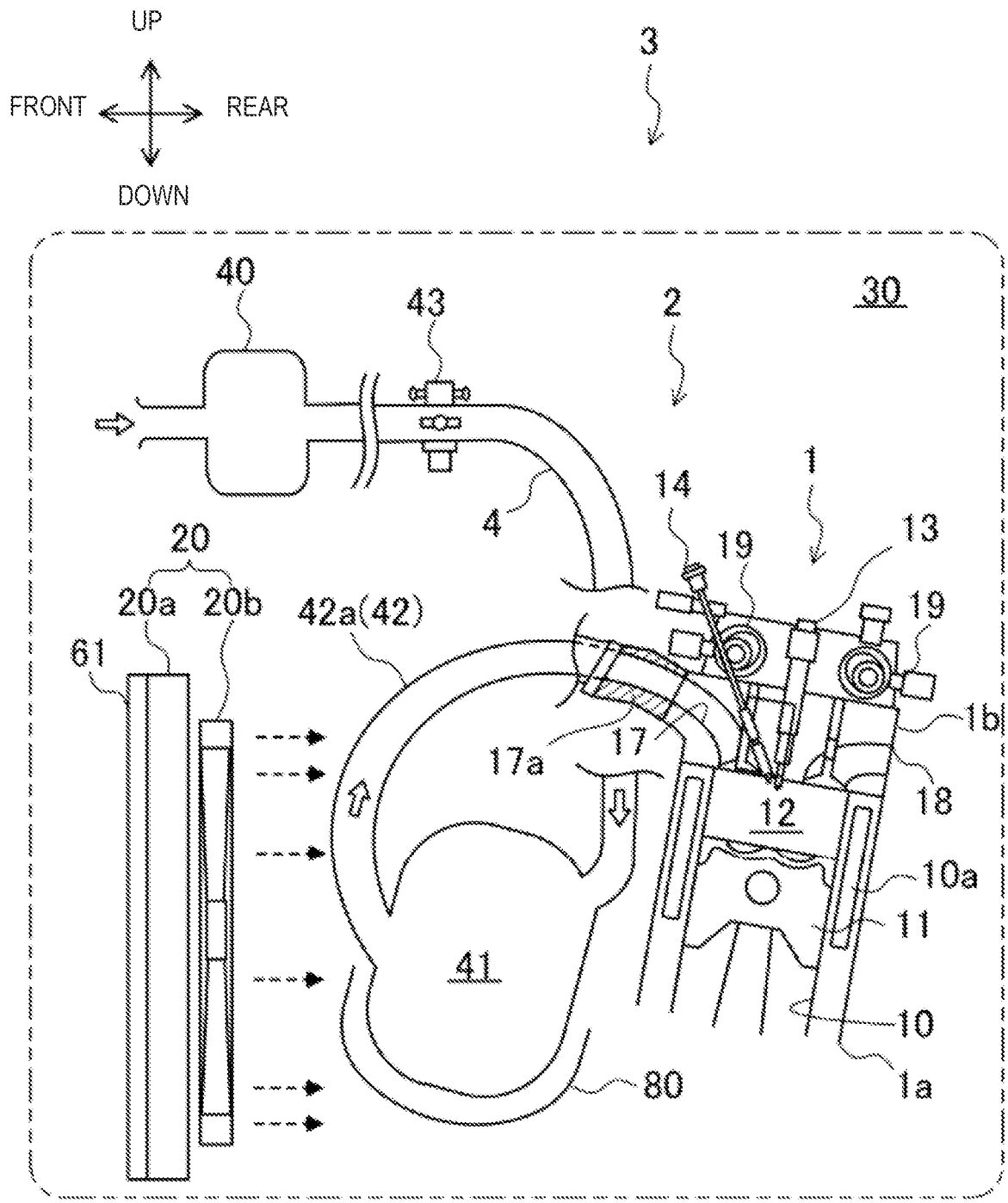
FIG. 1 is a schematic view illustrating an engine to which the disclosed technology is applied, and its intake system.
Figure 2:
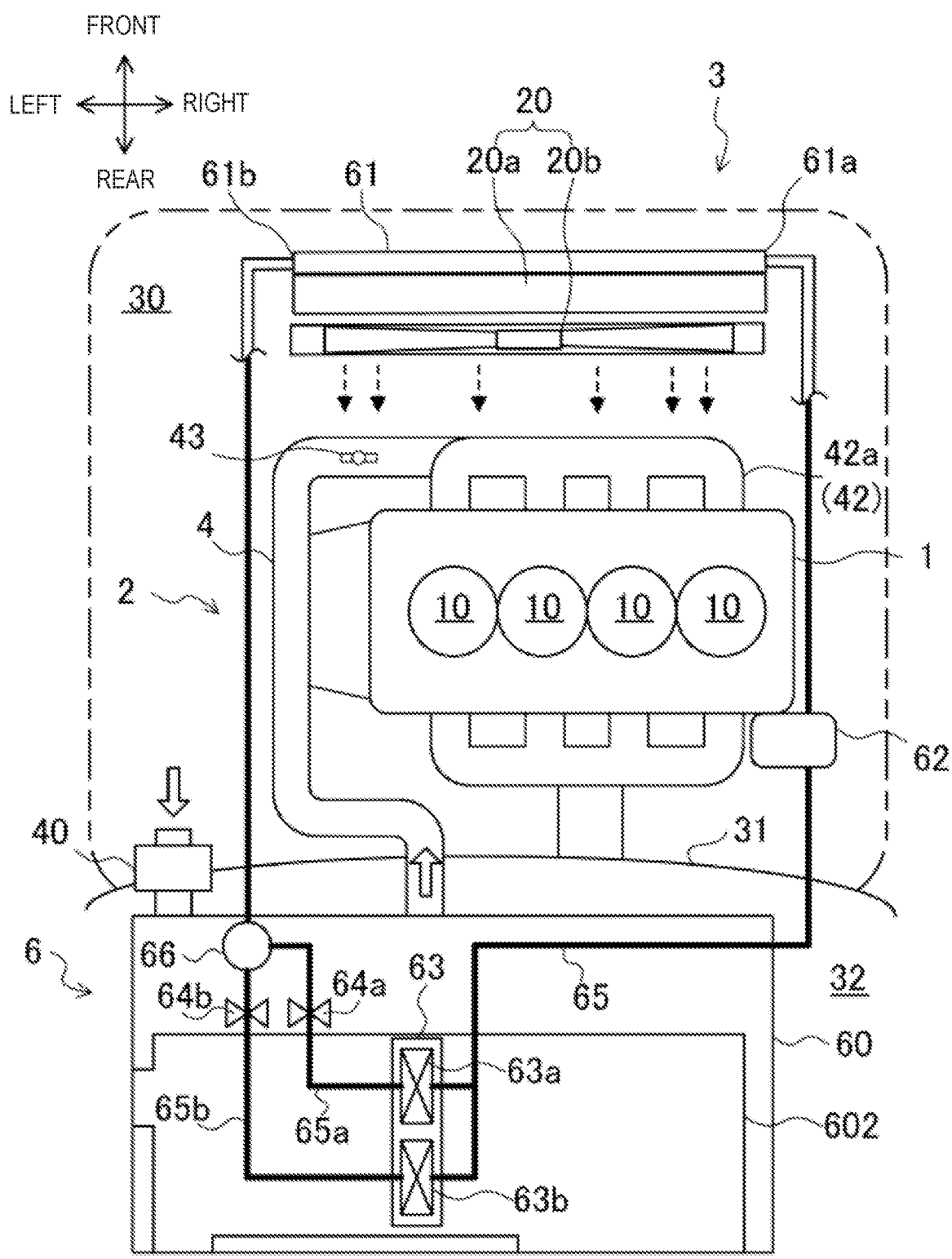
FIG. 2 is a schematic view illustrating the engine to which the disclosed technology is applied, and its intake system.

FIGS. 1 and 2 illustrate an engine 1 to which the disclosed technology is applied, and its intake system 2. The engine 1 and the intake system 2 are mounted in an engine bay 30 which is provided to a front part of an automobile 3 (vehicle). The automobile 3 travels as the engine 1 is in operation.

On the front side of the engine bay 30, a radiator unit 20 having a radiator 20a and a radiator fan 20b is installed. The radiator unit 20 is disposed so as to be adjacent to the rear side of a front grille which takes external air into the engine bay 30. The radiator 20a is comprised of a plate-like member constructed so that air is able to pass therethrough in its thickness direction, and is disposed so that one of the surfaces in the thickness direction is oriented forward.

The radiator 20a cools coolant of the engine 1. That is, hot coolant flows into the radiator 20a from the engine 1. Then, the coolant is cooled by heat exchange with air while passing through the radiator 20a, and the cold coolant is returned to the engine 1.

The radiator fan 20b is disposed close to and behind the radiator 20a. The radiator fan 20b sends rearward the air which is heated by passing through the radiator 20a. As the radiator fan 20b operates, the heat exchange of the radiator 20a is stimulated.

Note that although a condenser 61 of an air conditioner 6 is also disposed on the front side of the engine bay 30, it will be described later.

The engine 1 is installed behind the radiator unit 20 in the engine bay 30. In this embodiment, the engine 1 is an in-series four-cylinder engine in which four cylinders 10 are lined up in series (in FIG. 1, only one of the cylinders 10 is illustrated). This engine 1 is transversely placed in the engine bay 30 so that the four cylinders 10 are lined up in the left-and-right direction.

The engine 1 has a cylinder block 1a where the cylinders 10 are formed, and a cylinder head 1b placed on the cylinder block 1a. In order to cool the engine 1, a coolant passage 10a through which the coolant cooled by the radiator 20a flows is formed in each of the cylinder block 1a and the cylinder head 1b.

A piston 11 is slidably fitted in each cylinder 10. A combustion chamber 12 where combustion takes place is formed in an upper part of each cylinder 10. A lower surface of the combustion chamber 12 is constituted by an upper surface of the piston 11. The engine 1 combusts using gasoline as fuel, and performs four strokes comprised of intake, compression, combustion (expansion), and exhaust by the piston 11 repeatedly reciprocating in the up-and-down direction.

As described above, the geometric compression ratio of this engine 1 is designed to be 18:1 or higher. Therefore, during combustion in which the piston 11 is located near top dead center, the combustion chamber 12 has a high compression compared to conventional engines. Therefore, this engine 1 can improve its thermal efficiency from the conventional engines by performing appropriate combustion.

Further, the engine 1 has injectors 13 and spark plugs 14. The injector 13 and the spark plug 14 are attached to the cylinder head 1b for every cylinder 10. The injector 13 injects gasoline as fuel directly into the combustion chamber 12. The spark plug 14 ignites a mixture gas formed inside the combustion chamber 12.

In the cylinder head 1b, an intake port 17 and an exhaust port 18 are formed for every cylinder 10. An upstream end of the intake port 17 opens in a side surface of the cylinder head 1b on the front side. An upstream end of the exhaust port 18 opens in a side surface of the cylinder head 1b on the rear side. An intake valve is disposed at each intake port 17, and an exhaust valve is disposed at each exhaust port 18. Each of the intake valve and the exhaust valve opens and closes at a given timing by a control of a valve operating mechanism 19 provided for the valve.

(Intake Passage)

The engine 1 is connected to an intake passage 4. The intake passage 4 is a passage which supplies intake air, as air, to the combustion chamber 12 by taking in external air independently from the radiator unit 20. The intake passage 4 is disposed at the engine bay 30. However, in this engine 1, a part of the intake passage 4 runs into a cabin 32 side, as will be described later. An air cleaner 40 is disposed at an upstream end of the intake passage 4. A surge tank 41 is disposed at a downstream of the intake passage 4.

An intake manifold 42 having a plurality of independent intake distribution passages 42a which are branched for every cylinder 10 is provided downstream of the surge tank 41. A downstream end of each intake distribution passage 42a is connected to the upstream end of the intake port 17 of each cylinder 10. Note that, in the surge tank 41, although an intake passage cover 80 which covers the surge tank 41 is installed, this will be described later.

A throttle valve 43 is disposed at a part of the intake passage 4, downstream of the air cleaner 40 and upstream of the surge tank 41. An amount of the intake air introduced into the combustion chamber 12 is adjusted by changing the opening of the throttle valve 43. Note that although a supercharger which boosts the intake air may be installed at a part of the intake passage 4, downstream of the throttle valve 43 and upstream of the surge tank 41, the supercharger is not installed in this engine 1 (so-called "natural aspiration"). Further, although the supercharger is not installed in this engine 1, an exhaust gas recirculation (EGR) passage which constitutes an external EGR system which recirculates exhaust gas may be connected to a part downstream of the throttle valve 43 and upstream of the supercharger.

Figure 4:
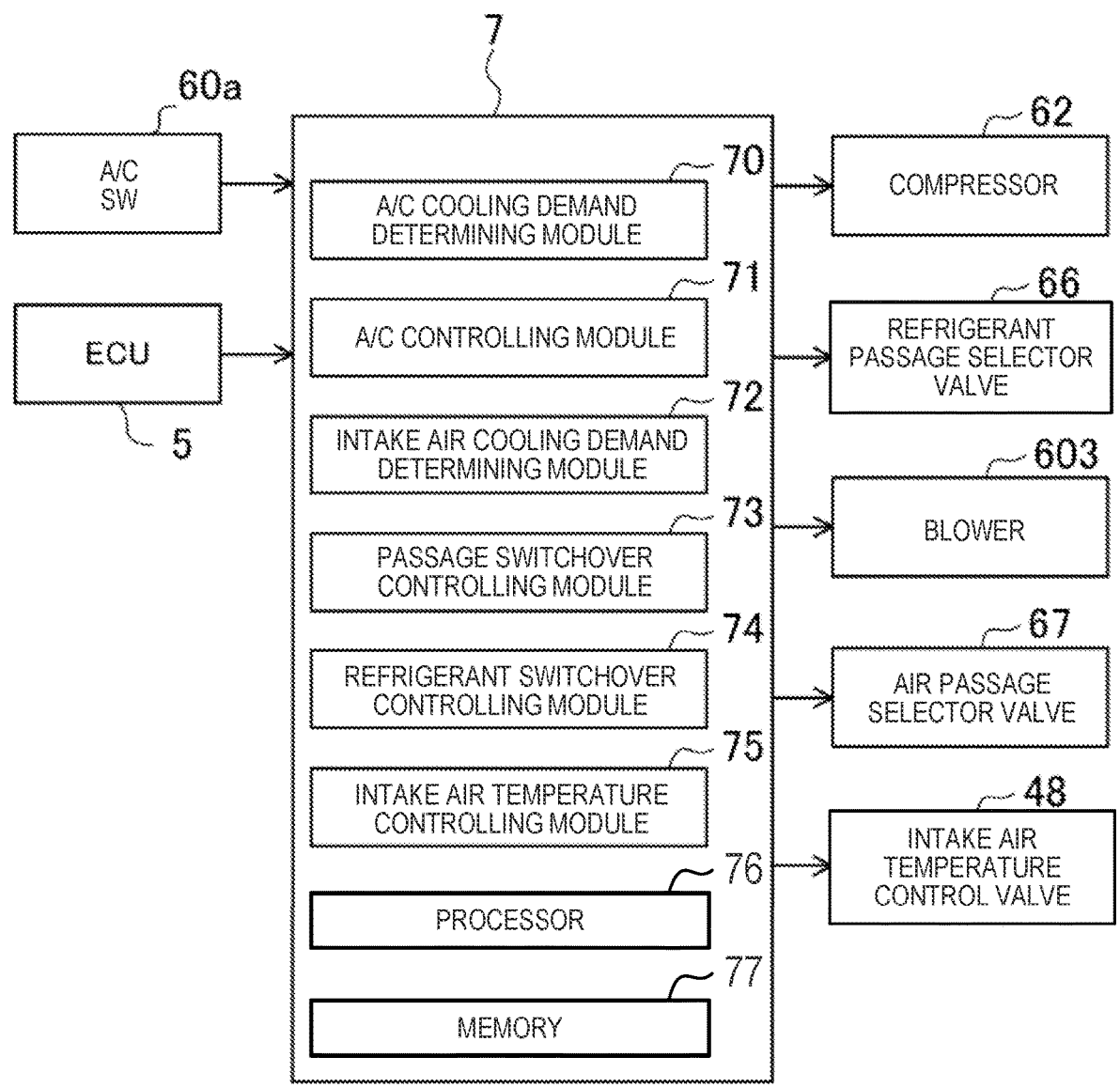
FIG. 4 is a block diagram illustrating a controller and its primary input and output (I/O) devices.

The engine 1 operates according to a control of an engine control unit (ECU) 5, which is illustrated only in FIG. 4. The ECU 5 is comprised of hardware, such as a processor which executes a program, memory, and an I/O device, and software, such as a control program implemented in the memory, and data for control.

Although not illustrated, in the automobile 3, various sensors, such as an intake air temperature sensor which detects a temperature of intake air, an exhaust temperature sensor which detects a temperature of exhaust gas, a water temperature sensor which detects a temperature of coolant, a crank angle sensor which detects a rotation angle of a crankshaft of the engine 1, and an accelerator opening sensor which detects an operating amount of an accelerator pedal, are installed. Based on signals inputted from these sensors, the ECU 5 controls operation of the injector 13, the spark plug 14, the valve operating mechanism 19, and the throttle valve 43 to operate the engine 1.

<Devise of Intake System>

As described above, in order for the engine 1 to raise the thermal efficiency, the geometric compression ratio is designed to be a high compression ratio of 18:1 or higher. Therefore, when the engine temperature is high, abnormal combustion, such as a knock, is easier to occur than the conventional engines. In order to suppress abnormal combustion, the control which delays the timing of combustion (so-called "combustion retarding") is needed when the engine 1 operates at high load.

Therefore, since a Minimum advance for the Best Torque (MBT) range is greatly limited to the low-load side of the engine even if the engine is made in the high compression ratio, the improvement in the thermal efficiency is impeded. Thus, in this engine 1, in order to improve the thermal efficiency, the engine temperature during operation is lowered (the low temperature shift of the engine) as described above.

Further, various devises are given to the intake system 2 of this engine 1, in addition to the conventional cooling by coolant, lubricating oil, etc. of the engine so as to realize a significant reduction of the intake air temperature (the target intake air temperature is 75° C. or less) which is one of the effective measures.

In detail, the measures comprised of "heat-receiving suppressing and heat-release stimulation of intake port," "intake air cooling using air conditioner," and "heat-receiving suppressing of intake passage" are taken for the intake system 2. Below, each of these measures is described concretely.

(Heat-Receiving Suppressing and Heat-Release Stimulation of Intake Port)

Normally, the cylinder head 1b is made of material with a high thermal conductivity, such as aluminum alloy. Since the intake port 17 is formed in the cylinder head 1b, the intake air tends to exchange heat, while flowing through the intake port 17.

On the other hand, as illustrated in a simplified manner in FIG. 1, heat insulation processing is applied to an upstream part 17a of the intake port 17 of the engine 1, with a heat insulating member made of a material with a low thermal conductivity, such as resin. The insulating member may be attached to the upstream part 17a of the intake port 17, or the insulating member may be embedded in the cylinder head 1b by insert molding.

Thus, the intake air which flows into the intake port 17 from the intake passage 4 can be prevented from receiving heat from the surrounding environment of the intake port 17 and increasing in temperature.

On the other hand, since a downstream part of the intake port 17 is close to the combustion chamber 12, it easily becomes hot. Further, when opening and closing the intake valve, hot mixture gas may flow into the intake port 17 because of blowback from the inside of the combustion chamber 12. Since the downstream part of the intake port 17 becomes hot more easily than the surrounding environment, the heat insulation processing is not applied to the downstream part of the intake port 17 to stimulate the heat release conversely.

By constituting the upstream part 17a of the intake port 17 so that its thermal insulation becomes higher than that of the downstream part, and by performing the heat-receiving suppressing and the heat-release stimulation in this way, the temperature of the intake air introduced into the combustion chamber 12 can be reduced.

(Intake Air Cooling Using Air Conditioner)

The target intake air temperature cannot be realized with normal measures, such as the heat insulation and the coolant temperature reduction.

Thus, in this engine 1, intake air itself is cooled. However, newly providing a cooling device to cool the intake air causes new problems, such as an increase in the number of members, an increase in the manufacturing cost, and a complication of the structure.

Regarding this, the intake system 2 of this engine 1 is configured so that intake air is cooled using a part of the air conditioner 6. By sharing the member(s), it can suppress the problems described above, such as the increase in the number of members.

In addition, it is devised by efficiently utilizing an evaporator 63 of the air conditioner 6 so that both the cooling of the intake air and the cooling of the air inside the cabin 32 can be performed appropriately. That is, when taking the status of use of the evaporator of the air conditioner into consideration, it is found that the evaporator of the air conditioner has remaining capacity when the cooling demand of the intake air is high.

Immediately after an engine start, the cooling demand of the air inside the cabin is high, and the cooling load of the evaporator is large. On the other hand, after an engine warm-up, the cooling load of the evaporator becomes smaller because the cabin is cooled, and therefore, the evaporator has remaining capacity, meanwhile, the cooling of the intake air is required after the engine warm-up. Thus, this intake system 2 is configured so that, without newly providing an evaporator in addition to the evaporator 63 of the air conditioner 6, the intake air can be cooled using the remaining capacity of the evaporator 63.

(Air Conditioner)

As illustrated in FIG. 2, the cabin 32 is provided rearward of the engine bay 30, having a dash panel 31 therebetween. A body part of the air conditioner 6 (air conditioner body 60) which air-conditions the cabin 32 is installed at the front side of the cabin 32 (the air conditioner body 60 is described in detail later). The air conditioner 6 is comprised of, in addition to the air conditioner body 60, the condenser 61, a compressor 62, the evaporator 63, expansion valves 64a and 64b, and a refrigerant passage 65.

The refrigerant passage 65 is a passage through which refrigerant circulates, and is comprised of piping, etc. The condenser 61, the compressor 62, the evaporator 63, and the expansion valves 64a and 64b are connected via the refrigerant passage 65. When defining the compressor 62 as a starting point, the condenser 61, the expansion valves 64a and 64b, and the evaporator 63 are disposed from upstream to downstream in the flow direction of the refrigerant.

This air conditioner 6 constitutes a part of the intake system 2 so as to cool the intake air as well. That is, part of the structures of the expansion valves 64a and 64b, the evaporator 63, and the refrigerant passage 65 of this air conditioner 6 is changed so as to be shared with the intake system 2.

In detail, a heat exchanger of the evaporator 63 is divided into a first heat exchanger (1st-HE) 63a and a second heat exchanger (2nd-HE) 63b which are mutually independent. In connection with this, a part of the refrigerant passage 65 is provided with a passage which branches into two (a first branch passage 65a which supplies the refrigerant to the first heat exchanger 63a, and a second branch passage 65b which supplies the refrigerant to the second heat exchanger 63b).

The branch part upstream of the refrigerant passage 65 is provided with a refrigerant passage selector valve 66 (one example of a refrigerant switch in the present disclosure) which switches a flow of the refrigerant to the first heat exchanger 63a and the second heat exchanger 63b. The refrigerant passage selector valve 66 switches the passage so that the refrigerant flows into one or both of the first heat exchanger 63a and the second heat exchanger 63b. When the refrigerant flows into both the first heat exchanger 63a and the second heat exchanger 63b, a distribution ratio of the refrigerant is adjustable by adjusting an opening of the refrigerant passage selector valve 66.

The first expansion valve 64a is installed in an upstream part of the first branch passage 65a, and the second expansion valve 64b is installed in an upstream part of the second branch passage 65b. By making a flow rate of each of the first expansion valve 64a and the second expansion valve 64b adjustable, the refrigerant passage selector valve 66 may be substituted. Note that although the air conditioner body 60 is also changed in connection with the sharing with the intake system 2, this will be described later.

The compressor 62 is a mechanical compressor and is attached to the engine 1. The compressor 62 is driven so as to be interlocked with operation of the engine 1. By being driven, the compressor 62 compresses gaseous refrigerant at low temperature and low pressure, and discharges the gaseous refrigerant at high temperature and high pressure. An output of the compressor 62 is changeable by controlling a clutch.

The compressor 62 may be an electric compressor which can be driven independently from the engine 1. Further, the control type may be a rotation control type or a capacity control type. The mode of the compressor 62 may be changed suitably according to the demanded specification.

The condenser 61 is installed on the front side of the engine bay 30. The condenser 61 is comprised of a plate-like member through which air passes in its thickness direction, and is disposed so that one of the surfaces is oriented forward. In this air conditioner 6, the condenser 61 is disposed so as to overlap with a front side of the radiator 20a. Note that the layout of the condenser 61 may be changed suitably according to the specification, such as rearward of the radiator 20a, or side by side with the radiator 20a.

The condenser 61 has a refrigerant flow inlet 61a and a refrigerant flow outlet 61b, and cools given refrigerant. That is, the gaseous refrigerant at high temperature and high pressure discharged from the compressor 62 flows into the condenser 61 from the refrigerant flow inlet 61a. Then, the gaseous refrigerant is cooled by heat exchange with air while passing through the condenser 61, and liquid refrigerant at low temperature and high pressure flows out of the refrigerant flow outlet 61b.

The liquid refrigerant at low temperature and high pressure which flows out of the refrigerant flow outlet 61b passes through the refrigerant passage selector valve 66, and flows into one or both of the first branch passage 65a and the second branch passage 65b. Then, the refrigerant becomes at low temperature and low pressure by passing through one or both of the first expansion valve 64a and the second expansion valve 64b. The refrigerant at low temperature and low pressure flows into the evaporator 63 (one or both of the first heat exchanger 63a and the second heat exchanger 63b).

While passing through the evaporator 63, the refrigerant absorbs heat by exchanging heat with air to evaporate. In connection with it, air which flows through an air passage 602 (described later) is cooled. The gaseous refrigerant at low temperature low pressure which passed through the evaporator 63 flows into the compressor 62.

(Air Conditioner Body)

Figure 3:
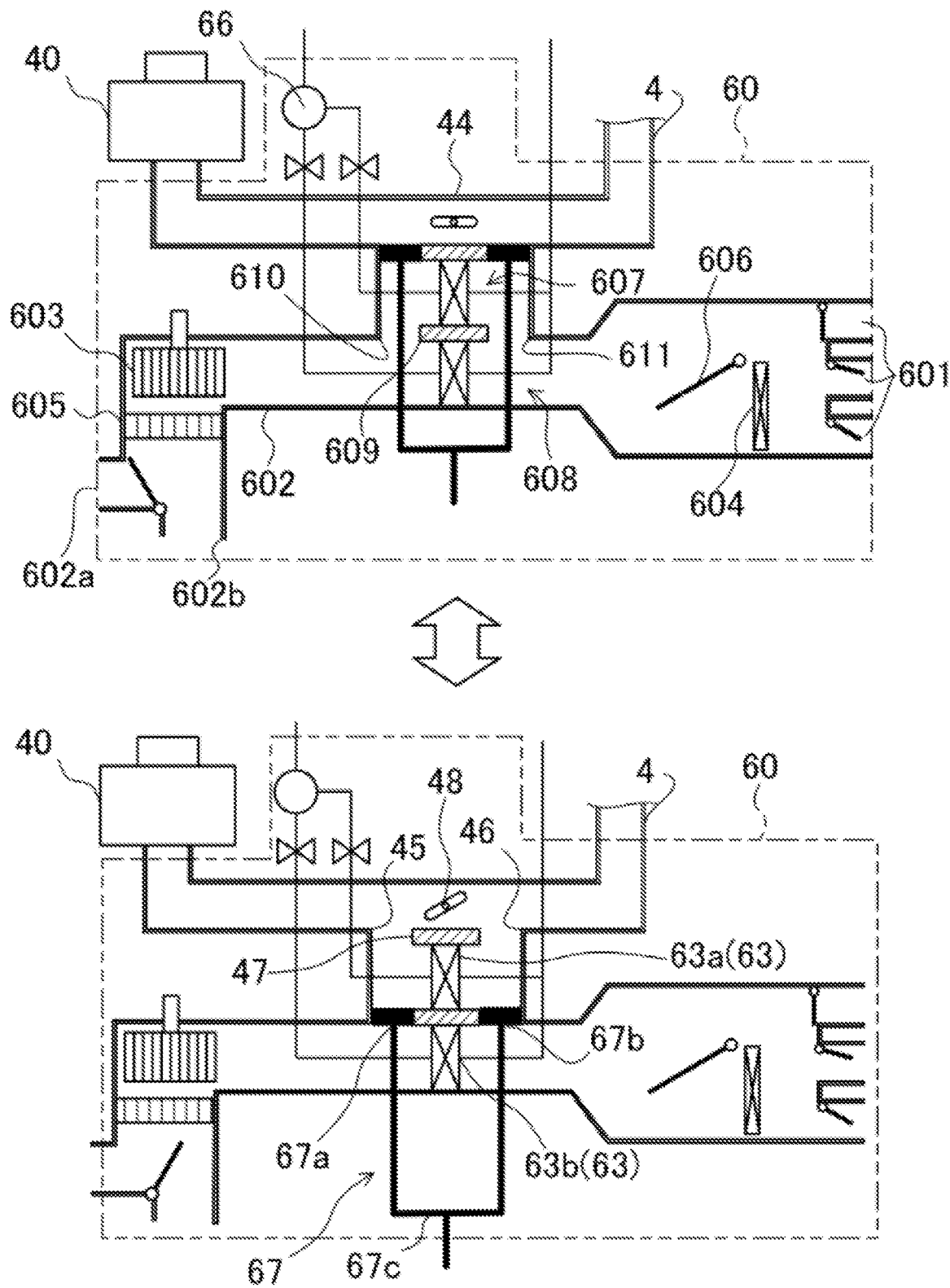
FIG. 3 is a schematic view illustrating a detailed structure of an air conditioner body, where the upper figure illustrates a state in which an air passage selector valve is at a cabin cooling position, and the lower figure illustrates a state in which the air passage selector valve is at an intake air cooling position.

FIG. 3 illustrates a detailed structure of the air conditioner body 60. The air conditioner body 60 is disposed so as to face the inside of the cabin 32. A switch (A/C SW) 60a (only illustrated in FIG. 4) for operating the air conditioner 6 is installed in a wall surface of the air conditioner body 60 which faces the cabin 32.

According to the operation of the switch 60a, the air conditioner body 60 blows temperature-adjusted air (cold air or warm air) from a blow opening (not illustrated) disposed at each location of the cabin 32, including defrost (DEF). The air conditioner body 60 is provided with, in addition to the evaporator 63, the air passage 602, a blower 603, and a heater 604, as a configuration which the air conditioner 6 is originally provided.

The air passage 602 is a duct-like passage formed inside the air conditioner body 60. The air passage 602 guides air into the cabin 32 by a given flow. That is, two air inlets (an external air inlet 602a and an internal air inlet 602b) which are switchable therebetween are provided to an upstream end of the air passage 602. The external air inlet 602a introduces air outside the vehicle (external air), and the internal air inlet 602b introduces air inside the cabin 32.

The blower 603 is installed in a part of the air passage 602 downstream of the air inlets 602a and 602b via a filter 605. By driving the blower 603, air is forcibly introduced into the air passage 602 through the air inlets 602a and 602b. On the other hand, a plurality of (in the illustrated example, three) outlets 601 are provided to a downstream end of the air passage 602 so that they can be opened and closed according to the operation of the switch 60a. These outlets 601 communicate with the blow opening described above.

The heater 604 and a shutter 606 are installed in a part of the air passage 602 upstream of the outlet 601. When the shutter 606 pivots, the air passage 602 switches between a heating passage which passes through the heater 604 and a bypass passage which bypasses through the heater 604. By activating the heater 604 and controlling the shutter 606 so that air flows into the heating passage, air which blows in the cabin 32 can be heated.

The evaporator 63 is disposed at a part of the air passage 602 downstream of the blower 603 and upstream of the heater 604 and the shutter 606. As illustrated in the upper figure of FIG. 3, the air passage 602 is divided into two in connection with the division of the heat exchanger of the evaporator 63. Thus, a first division passage 607 and a second division passage 608 are provided to the air passage 602.

In detail, a second partition wall part 609 is provided between the first heat exchanger 63a and the second heat exchanger 63b, and the air passage 602 is divided into two, the first division passage 607 and the second division passage 608, by the second partition wall part 609. Therefore, the first heat exchanger 63a is disposed at the first division passage 607, and the second heat exchanger 63b is disposed at the second division passage 608.

The second division passage 608 is provided so as to continue from the air passage 602, and the first division passage 607 is provided so as to protrude to the side from the air passage 602 and become in parallel with the second division passage 608. An upstream communicating path 610 is provided upstream of the second partition wall part 609, and a downstream communicating path 611 is provided downstream of the second partition wall part 609. The second division passage 608 and the first division passage 607 communicate with each other via the upstream communicating path 610 and the downstream communicating path 611.

A part of the intake passage 4 downstream of the air cleaner 40 and upstream of the throttle valve 43 is incorporated into the air conditioner body 60 to cool the intake air. The intake passage 4 incorporated into the air conditioner body 60 is provided with a temperature adjustment passage 44 which is in contact with and is in parallel with the first division passage 607. As illustrated in the lower figure of FIG. 3, the temperature adjustment passage 44 is configured to communicate with the first division passage 607 via an upstream connecting passage 45 and a downstream connecting passage 46.

In detail, on the opposite side of the second heat exchanger 63b with respect to the first heat exchanger 63a, a first partition wall part 47 having the same structure as the second partition wall part 609 is disposed in parallel with the second partition wall part 609. Thus, the second division passage 608 and the temperature adjustment passage 44 are divided by the first partition wall part 47, where the upstream connecting passage 45 is provided upstream of the first partition wall part 47, and the downstream connecting passage 46 is provided downstream of the first partition wall part 47.

An intake air temperature control valve 48 is installed in a part of the temperature adjustment passage 44 between the upstream connecting passage 45 and the downstream connecting passage 46. According to the control of a controller 7 (described later), the intake air temperature control valve 48 adjusts the valve opening to change an amount of the intake air which flows through the temperature adjusting part.

Further, in order to intercept or open each of the upstream communicating path 610 and the downstream communicating path 611, and the upstream connecting passage 45 and the downstream connecting passage 46, an air passage selector valve 67 (one example of a passage switch in the present disclosure) is provided to the air conditioner body 60. The air passage selector valve 67 has an upstream valve 67a which intercepts the upstream communicating path 610 or the upstream connecting passage 45, a downstream valve 67b which intercepts the downstream communicating path 611 or the downstream connecting passage 46, and a valve arm 67c which supports both the upstream valve 67a and the downstream valve 67b.

When the valve arm 67c moves forward and rearward, the air passage selector valve 67 displaces between a position illustrated in the upper figure of FIG. 3 (cabin cooling position) and a position illustrated in the lower figure of FIG. 3 (intake air cooling position). When the position of the air passage selector valve 67 changes to the cabin cooling position or the intake air cooling position, air cooled by passing through the first heat exchanger 63a (first air) is switched to either one of the air of the air conditioner 6 or the intake air. In addition, the flowing direction of the first air is switched to the air passage 602 or the intake passage 4.

In detail, when the air passage selector valve 67 is located at the cabin cooling position, the upstream valve 67a and the downstream valve 67b intercept the upstream connecting passage 45 and the downstream connecting passage 46, and open the upstream communicating path 610 and the downstream communicating path 611, respectively. Therefore, part of the air of the air conditioner 6 which flows from upstream of the air passage 602 to the second division passage 608 flows into the first division passage 607 through the upstream communicating path 610, and then passes through the first heat exchanger 63a. The air of the air conditioner 6 cooled by passing through the first heat exchanger 63a (first air) flows into the second division passage 608 through the downstream communicating path 611, flows downstream from the air passage 602, and is then guided into the cabin 32.

Further, when the air passage selector valve 67 is located at the intake air cooling position, the upstream valve 67a and the downstream valve 67b open the upstream connecting passage 45 and the downstream connecting passage 46, and intercept the upstream communicating path 610 and the downstream communicating path 611, respectively. Thus, all or part of the intake air which flows from upstream of the intake passage 4 to the temperature adjustment passage 44 flows into the first division passage 607 through the upstream connecting passage 45, and it passes through the first heat exchanger 63a. The intake air cooled by passing through the first heat exchanger 63a (first air) flows into the temperature adjustment passage 44 through the downstream communicating path 611, flows downstream from the intake passage 4, and is then guided into the engine 1.

On the other hand, even when the air passage selector valve 67 is located at either the cabin cooling position or the intake air cooling position, air cooled by passing through the second heat exchanger 63b (second air) is only the air of the air conditioner 6. That is, the second heat exchanger 63b is exclusive for the air conditioner.

The remaining air of the air conditioner 6 which flows into the second division passage 608 from upstream of the air passage 602 passes through the second heat exchanger 63b. The air of the air conditioner 6 cooled by passing through the second heat exchanger 63b (second air) flows downstream of the air passage 602 from the second division passage 608, and is then guided into the cabin 32.

(Controller)

FIG. 4 illustrates the controller 7 and its primary input/output (I/O) devices. The controller 7 is a device which comprehensively controls the operation of the intake system 2, and is comprised of hardware, such as a processor 76 which executes a program, memory 77, and I/O devices, and software, such as a control program implemented in the memory 77, data for the control.

Control signals are inputted into the controller 7 from the switch 60a installed in the air conditioner body 60, the ECU 5, etc. From the controller 7, control signals are outputted to the compressor 62, the refrigerant passage selector valve 66, the blower 603, the air passage selector valve 67, and the intake air temperature control valve 48. The controller 7 controls operation of each of the compressor 62, the refrigerant passage selector valve 66, the blower 603, the air passage selector valve 67, and the intake air temperature control valve 48, based on the inputted control signal(s).

The controller 7 has an air conditioner cooling demand determining module 70, an air conditioner controlling module 71, an intake air cooling demand determining module 72, a passage switchover controlling module 73, a refrigerant switchover controlling module 74, and an intake air temperature controlling module 75. These modules are executed by the processor 76 to perform their respective functions and are stored in the memory 77 as software. Note that the controller 7 may be constituted integrally with the ECU 5.

The air conditioner cooling demand determining module 70 determines the existence of a cooling demand for the air inside the cabin 32 based on the control signal inputted from the switch 60a of the air conditioner 6. The air conditioner controlling module 71 controls operation of the air conditioner 6 (the compressor 62 and the blower 603) based on the control signal inputted from the switch 60a of the air conditioner 6. The intake air cooling demand determining module 72 identifies the operating state of the engine 1 based on the control signal inputted from the ECU 5, and an operating range map of the engine 1 (described later), and determines the existence of the cooling demand for the intake air.

The passage switchover controlling module 73 controls operation of the air passage selector valve 67. The refrigerant switchover controlling module 74 controls operation of the refrigerant passage selector valve 66. The intake air temperature controlling module 75 controls operation of the intake air temperature control valve 48. These collaborate with the air conditioner cooling demand determining module 70, the air conditioner controlling module 71, and the intake air cooling demand determining module 72 to control the operation of each device.

(Engine Operating Range Map)

Figure 5:
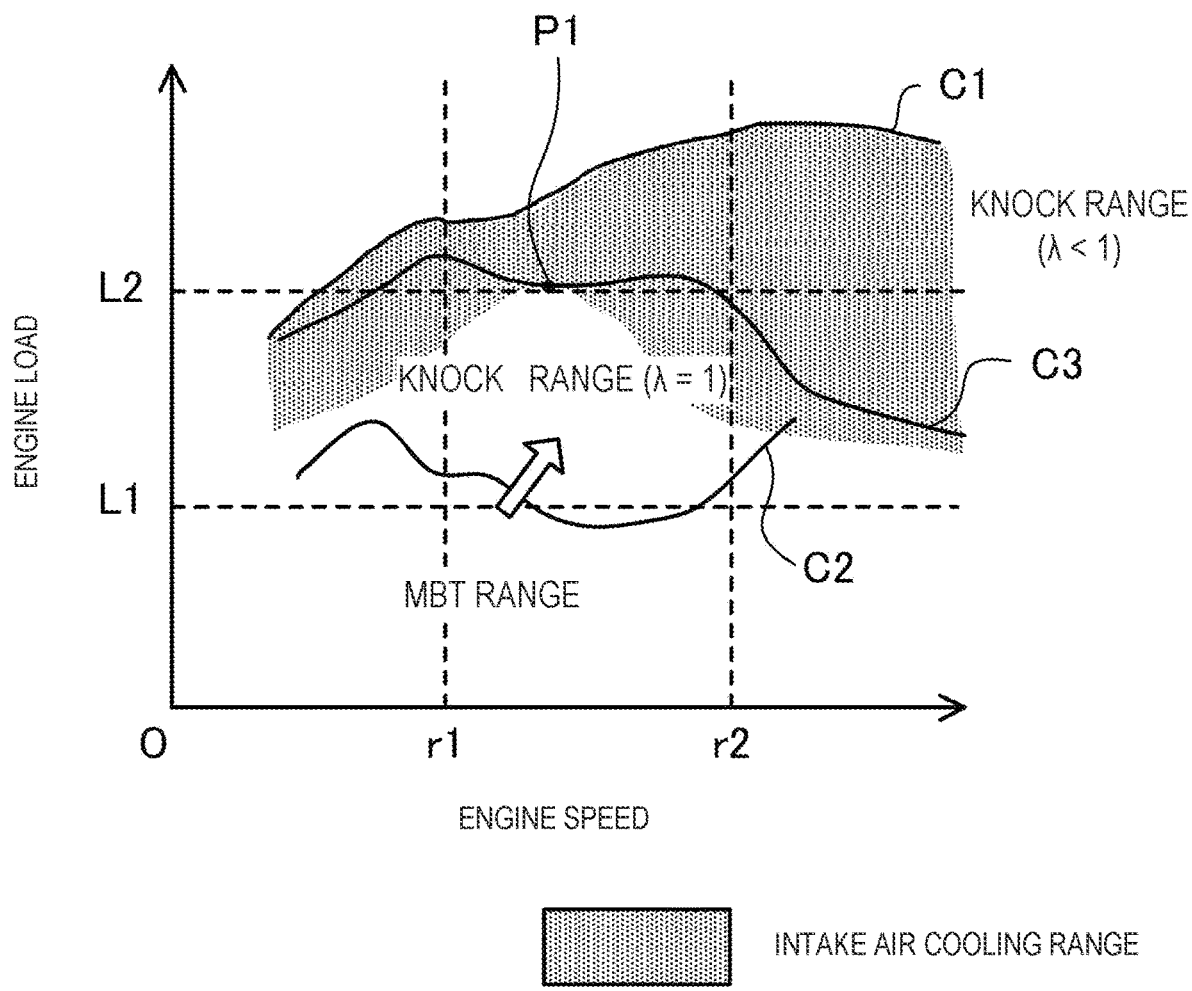
FIG. 5 is a schematic view illustrating an operating range map of the engine.

FIG. 5 illustrates the operating range map of the engine 1. The operating range of the engine 1 is defined by its load (torque) and the engine speed. The controller 7 acquires, during operation of the engine 1, the control signals of the accelerator opening sensor, the crank angle sensor, etc. from the ECU 5, and detects the load and the engine speed of the engine 1, and identifies the operating state of the engine 1 with reference to the map.

A curve C1 indicates the maximum load of the engine 1. The engine 1 operates in a range below the curve C1. A curve C2 indicates a boundary between an MBT range and a knock range, when not performing the intake air cooling. A range below the curve C2 is the MBT range, and a range above the curve C2 is the knock range. A curve C3 indicates a boundary where an excess air ratio of mixture gas used for combustion in the knock range is changed. Below the curve C3 is a first knock range where a mixture gas of a substantially stoichiometric air fuel ratio combusts, and above the curve C3 is a second knock range where a rich mixture gas combusts.

The knock range is a range where abnormal combustion may occur. Therefore, as described above, abnormal combustion is suppressed by the combustion retarding in the knock range. Since abnormal combustion tends to occur as the load increases, the abnormal combustion is suppressed in the second knock range by also increasing the fuel amount. The combustion in the knock range impedes the improvement in the thermal efficiency.

Particularly, since this engine 1 is high in the compression ratio, its knock range is large. In connection with it, the MBT range becomes narrower. In order to improve the thermal efficiency, it is necessary to expand the MBT range to the higher load side, as illustrated by an arrow. Then, this intake system 2 performs the intake air cooling utilizing the air conditioner 6. Therefore, it reduces the intake air temperature significantly to expand the MBT range.

In FIG. 5, a range illustrated by dots indicates a range where the intake air cooling is performed (intake air cooling range). The controller 7 determines the existence of the cooling demand for the intake air based on whether the identified operating state of the engine 1 falls within the intake air cooling range.

Note that, as illustrated in FIG. 5, the intake air cooling is not performed throughout the knock range. Since the intake air cooling also consumes the fuel by itself, it is performed in a range where the effect can be acquired as a whole in terms of the improvement in the thermal efficiency.

In detail, the intake air cooling is performed in the high-load range, without performing the intake air cooling in the low-load range.

The operating range of the engine 1 is divided into three ranges in its load direction, a low-load range, a middle-load range, and a high-load range. The low-load range is a range below a given load L1, and the high-load range is a range above a given load L2. The middle-load range is a range above the load L1 and below the load L2. For example, the loads L1 and L2 are loads which substantially equally divide the operating range of the engine 1 into three in the load direction.

There is almost no necessity in the low-load range to suppress abnormal combustion; however, in the high-load range, the necessity of suppressing abnormal combustion is high. Therefore, by performing the intake air cooling in the high-load range without performing the intake air cooling in the low-load range, the intake air cooling can be performed efficiently, and the thermal efficiency can be improved effectively.

Further, the maximum load in the range where the intake air cooling is not performed in a middle-load middle-speed range is set larger than the maximum load in the range where the intake air cooling is not performed in each of a middle-load low-speed range and a middle-load high-speed range.

The operating range of the engine 1 is divided in the engine speed direction into three ranges, a low-speed range, a middle-speed range, and a high-speed range. The low-speed range is a range below a given engine speed r1, and the high-speed range is a range above a given engine speed r2. The middle-speed range is a range above the engine speed r1 and below the engine speed r2. For example, the engine speeds r1 and r2 are engine speeds which substantially equally divide the operating range of the engine 1 into three in the engine speed direction.

The middle-speed range in the middle-load range (middle-load middle-speed range) is mostly the knock range. However, the range where the intake air cooling is not performed (intake air non-cooling range) spreads out to a greater part of the knock range. Moreover, a local maximum (maximum load) of the intake air non-cooling range illustrated by P1 in FIG. 5 reaches near the maximum of the first knock range.

In the middle-load middle-speed range, the fuel consumption due to the intake air cooling exceeds the fuel consumption suppressing effect which is acquired by suppressing abnormal combustion, in addition to the abnormal combustion being comparatively minor. Therefore, in the middle-load middle-speed range, the intake air cooling is not performed in its major range, even if it is in the knock range.

On the other hand, in the knock range of the low-speed range in the middle-load range (middle-load low-speed range) and the high-speed range in the middle-load range (middle-load high-speed range), the intake air cooling range is larger than the intake air non-cooling range. In these ranges, the fuel consumption suppressing effect acquired by suppressing abnormal combustion exceeds the fuel consumption due to the intake air cooling. As a result, the maximum load in the intake air non-cooling range in these ranges is smaller than the maximum load in the intake air non-cooling range in the middle-load middle-speed range.

Further, the intake air cooling range in the middle-load high-speed range is set larger than the intake air cooling range in the middle-load low-speed range.

In the knock range of the middle-load low-speed range, the first knock range is larger than the second knock range. On the other hand, in the knock range of the middle-load high-speed range, the second knock range is larger than the first knock range. Further, as for the second knock range, it is larger in the middle-load high-speed range than in the middle-load low-speed range. Therefore, in the middle-load high-speed range, the effect by the intake air cooling can be acquired higher than in the middle-load low-speed range. Therefore, the intake air cooling range in the middle-load high-speed range is set larger than the intake air cooling range in the middle-load low-speed range.

<Example Control of Intake Air Cooling by Intake System>

Figure 6:
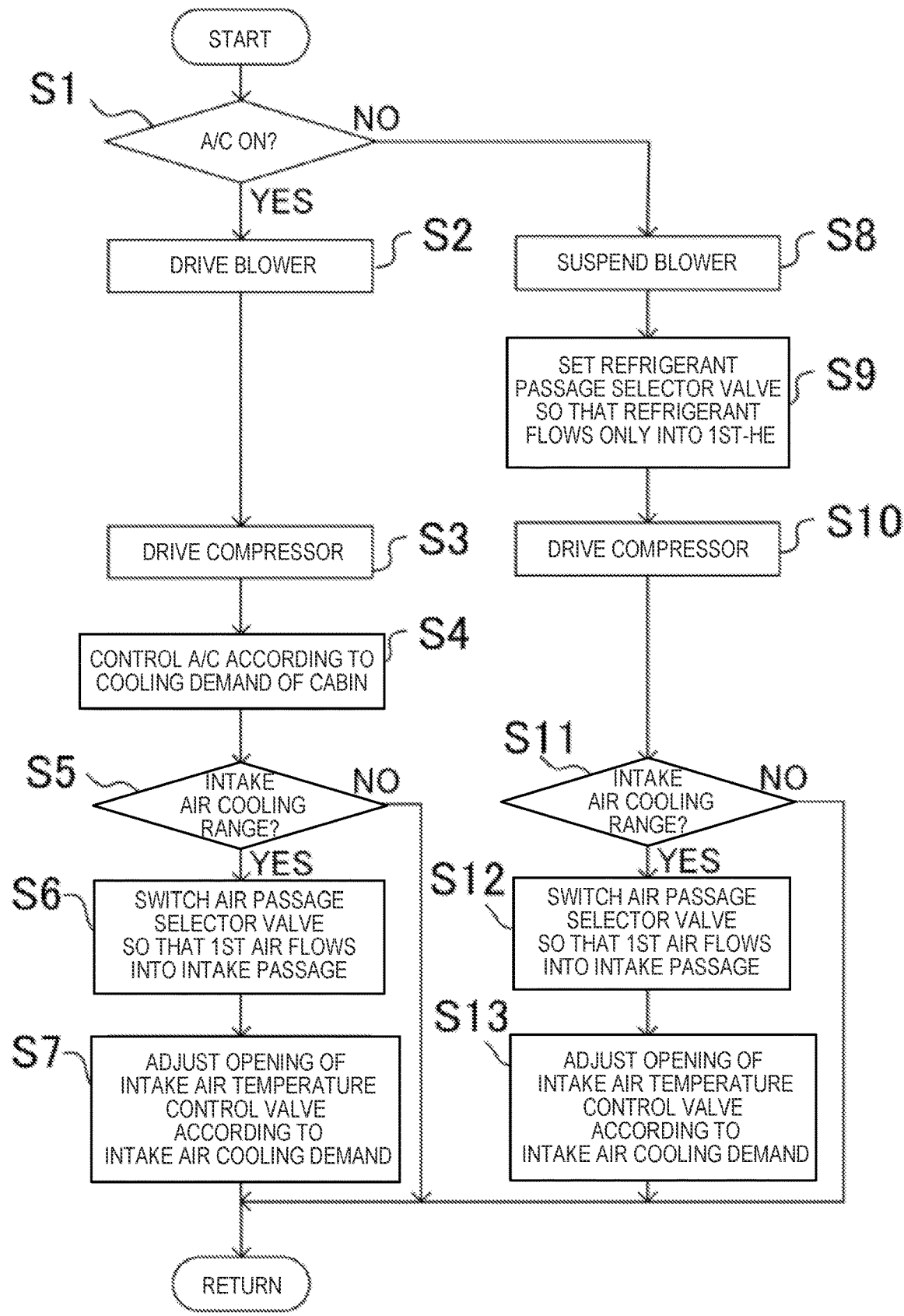
FIG. 6 is a flowchart illustrating one example of a fundamental control of the intake air cooling.

FIG. 6 illustrates a fundamental example control of the intake air cooling performed by the controller 7. Note that the initial state of the intake system 2 is the state illustrated in the upper figure of FIG. 3 (a state where the air conditioner 6 and the intake system 2 are mutually independent, similar to the conventional technologies). That is, the air passage selector valve 67 is located at the cabin cooling position, and the intake passage 4 and the air passage 602 are independent from each other. The refrigerant passage selector valve 66 is set to the passage through which the refrigerant flows into both the first heat exchanger 63a and the second heat exchanger 63b. Further, the intake air temperature control valve 48 is set to be fully opened.

When the switch 60a of the air conditioner 6 is ON, the air conditioner 6 cools so that the cabin 32 reaches a preset temperature. The controller 7 (the air conditioner cooling demand determining module 70) determines whether there is the cooling demand of the air conditioner 6 based on the operation of the switch 60a of the air conditioner 6 (Step S1).

(When Air Conditioner is ON)

If determined that there is the cooling demand of the air conditioner 6, the controller 7 (air conditioner controlling module 71) activates the air conditioner 6 to cool the air inside the cabin 32. That is, it drives the blower 603 and the compressor 62 (Steps S2 and S3). Therefore, the refrigerant is supplied to both the first heat exchanger 63a and the second heat exchanger 63b. The air is sent to the cabin 32 through the air passage 602. The air cooled by both the first heat exchanger 63a and the second heat exchanger 63b blows in the cabin 32, and the cabin 32 is cooled.

The controller 7 (air conditioner controlling module 71) controls the air conditioner 6 according to the cooling demand (Step S4). For example, it fluctuates the output of the compressor 62 and fluctuates the air amount of the blower 603.

Then, the controller 7 (intake air cooling demand determining module 72) determines whether the operating state of the engine 1 falls within the intake air cooling range, during the operation of the engine 1 (Step S5). Then, if determined that the operating state of the engine 1 falls within the intake air cooling range (that is, there is the cooling demand for the intake air) (Yes at Step S5), the controller 7 (passage switchover controlling module 73) switches the air passage selector valve 67 to the intake air cooling position (the state illustrated in the lower figure of FIG. 3) (Step S6).

Therefore, all or part of the intake air which flows into the temperature adjustment passage 44 from upstream of the intake passage 4 flows into the first division passage 607 through the upstream connecting passage 45, and passes through the first heat exchanger 63a. The intake air is cooled by passing through the first heat exchanger 63a. Then, the cooled intake air (first air) flows into the temperature adjustment passage 44 through the downstream communicating path 611, flows downstream from the intake passage 4, and is then guided into the engine 1.

The controller 7 (intake air temperature controlling module 75) adjusts the opening of the intake air temperature control valve 48 according to the cooling demand of the intake air (Step S7). For example, when the cooling demand of the intake air is high, the controller 7 reduces the opening so that the first air amount increases, and when the cooling demand of the intake air is low, it increases the opening so that the first air amount decreases. Therefore, the intake air temperature is stabilized to the demanded temperature.

On the other hand, if determined that the operating state of the engine 1 does not fall within the intake air cooling range (that is, there is no cooling demand for the intake air) (No at Step S5), the controller 7 (passage switchover controlling module 73) holds the air passage selector valve 67 at the cabin cooling position (the initial state illustrated in the upper figure of FIG. 3).

Therefore, part of the air of the air conditioner 6 which flows into the second division passage 608 from upstream of the air passage 602 flows into the first division passage 607 through the upstream communicating path 610, and it passes through the first heat exchanger 63a. The air of the air conditioner 6 is cooled by passing through the first heat exchanger 63a. Then, after the cooled air (first air) of the air conditioner 6 flows through the first division passage 607 as it is, it then flows into the second division passage 608 through the downstream communicating path 611, flows downstream from the air passage 602, and is then guided into the cabin 32.

Note that regardless of the operating state of the engine 1, the remaining air of the air conditioner 6 passes through the second heat exchanger 63b and is cooled. This air (second air) flows downstream from the air passage 602 from the second division passage 608, and is then guided into the cabin 32. Therefore, when there is the cooling demand of the air conditioner 6, the cooling of the cabin 32 can also be performed regardless of the existence of the cooling of the intake air. Therefore, both the cooling of the intake air and the cooling of the air inside the cabin 32 can be achieved.

(When Air Conditioner is OFF)

If determined that there is no cooling demand of the air conditioner 6, the controller 7 does not need to activate the air conditioner 6. Therefore, essentially, it is not necessary to activate each apparatus of the air conditioner 6, such as the blower and the compressor 62.

Regarding this, this intake system 2 performs a pre-cooling control so that the intake air can be cooled promptly when there is the cooling demand of the intake air. Note that, at this time, the intake system 2 is in the initial state where the air passage selector valve 67 is located at the cabin cooling position (the state illustrated in the upper figure of FIG. 3).

If determined that there is no cooling demand of the air conditioner 6 (No at Step S1), the controller 7 (air conditioner controlling module 71) continues the suspension of the blower 603 (Step S8). Therefore, the air does not flow into the air passage 602. Then, the controller 7 (refrigerant switchover controlling module 74) moves the refrigerant passage selector valve 66 to set it to the passage through which the refrigerant flows only into the first heat exchanger 63a (Step S9). Then, the controller 7 (air conditioner controlling module 71) drives the compressor 62 (Step S10).

Therefore, although the refrigerant is supplied only to the first heat exchanger 63a, since the air does not flow into the air passage 602, the first heat exchanger 63a and the periphery part of the air passage 602 (especially, inside of the first division passage 607) is cooled promptly and is held at this cooled state.

Then, the controller 7 (intake air cooling demand determining module 72) determines whether the operating state of the engine 1 falls within the intake air cooling range, during the operation of the engine 1, similar to the case where the air conditioner 6 is ON (Step S11). Then, if determined that the operating state of the engine 1 falls within the intake air cooling range (that is, there is the cooling demand for the intake air) (Yes at Step S11), the controller 7 (passage switchover controlling module 73) switches the air passage selector valve 67 to the intake air cooling position (the state illustrated in the lower figure of FIG. 3) (Step S12).

Therefore, all or part of the intake air flows into the first division passage 607 through the upstream connecting passage 45, and the intake air is cooled by passing through the first heat exchanger 63a. At this time, as described above, since the first heat exchanger 63a and the periphery part of the air passage 602 (especially, inside of the first division passage 607) are cooled, they can cool the intake air promptly.

Then, the cooled intake air (first air) flows into the temperature adjustment passage 44 through the downstream connecting passage 46, flows downstream from the intake passage 4, and is then guided into the engine 1. Appropriate combustion can be performed promptly, without any delay from the cooling demand of the intake air. Therefore, the thermal efficiency improves.

After that, similar to the case where the air conditioner 6 is ON, the controller 7 (intake air temperature controlling module 75) adjusts the opening of the intake air temperature control valve 48 according to the cooling demand of the intake air (Step S13).

If determined that the operating state of the engine 1 does not fall within the intake air cooling range (that is, there is no cooling demand for the intake air) (No at Step S11), the controller 7 (passage switchover controlling module 73) holds the air passage selector valve 67 at the cabin cooling position (the initial state illustrated in the upper figure of FIG. 3).

Therefore, the first heat exchanger 63a and the periphery part of the air passage 602 (especially, inside of the first division passage 607) are held in the state where they are cooled. Therefore, if there is the cooling demand for the intake air, the intake air can be cooled promptly.

<Example Time Chart of Intake Air Cooling by Intake System>

Since the intake system 2 shares a part of the air conditioner 6 (the first heat exchanger 63a etc.), the control of the intake air cooling can be roughly divided into two controls, depending on ON/OFF of the air conditioner 6.

Figure 7:
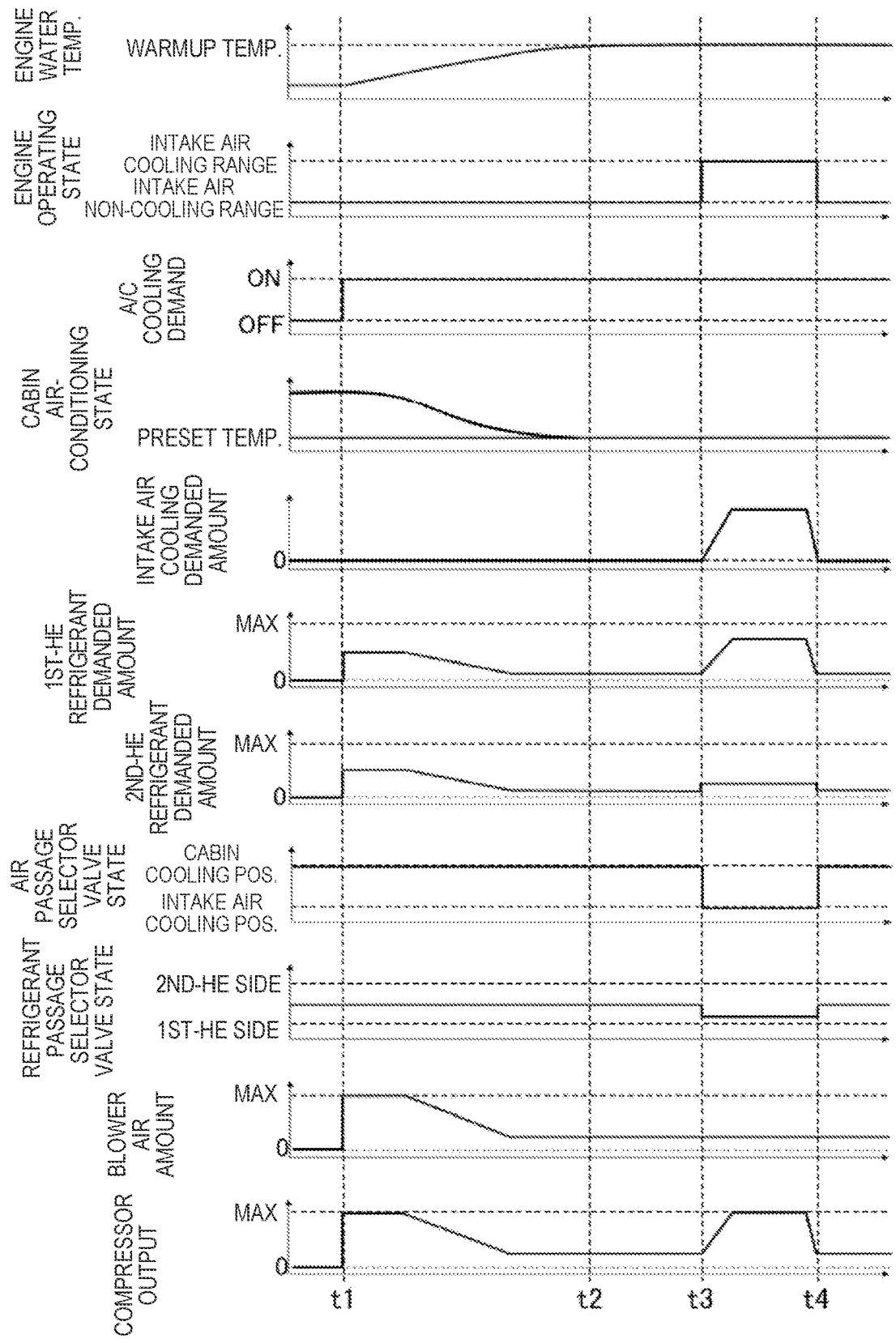
FIG. 7 is one example of a time chart of the intake air cooling.
Figure 8:
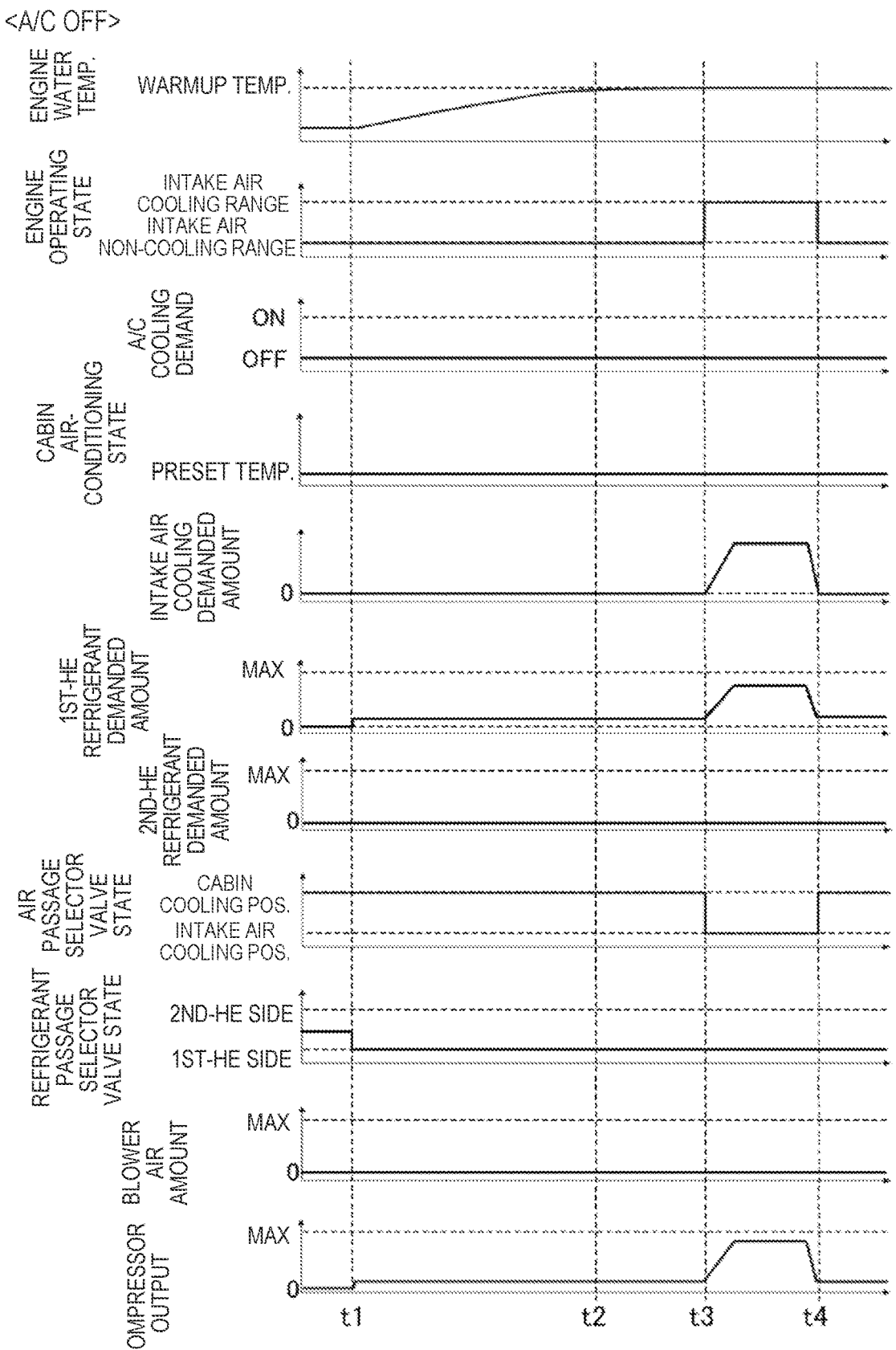
FIG. 8 is one example of the time chart of the intake air cooling.

FIG. 7 illustrates a time chart of the primary elements when the air conditioner 6 is ON. FIG. 8 illustrates a time chart of the primary elements when the air conditioner 6 is OFF. Both the time charts indicate a case where there is a cooling demand of the intake air at a given timing, after the engine 1 is started and finishes a warm-up.

The illustrated elements are, sequentially from the top, the water temperature of the engine 1, the operating state of the engine 1, the cooling demand of the air conditioner 6, the air-conditioning state of the cabin 32, the cooling demanded amount of the intake air, the refrigerant demanded amount of the first heat exchanger 63a, the refrigerant demanded amount of the second heat exchanger 63b, the state of the air passage selector valve 67, the state of the refrigerant passage selector valve 66, the air amount of the blower 603, and the output of the compressor 62.

A timing t1 in the horizontal axis indicates a timing of a start of the engine 1. Similarly, a timing t2 indicates a timing of the completion of the warm-up of the engine 1, a timing t3 indicates a timing of a start of the cooling demand of the intake air, and a timing t4 indicates a timing of an end of the intake air cooling demand.

(Before Engine Start)

The state before the start of the engine 1 is the same when the air conditioner 6 is ON and OFF (initial state). For example, it is a state where the automobile 3 is stopped completely. Therefore, the water temperature of the engine 1 is low (so-called "cold state").

Since the automobile 3 is not used, the operating state of the engine 1 falls within the intake air non-cooling range, and the cooling demanded amount of the intake air, the refrigerant demanded amounts of the first heat exchanger 63a and the second heat exchanger 63b, the air amount of the blower 603, and the output of the compressor 62 are 0. Further, the air passage selector valve 67 is located at the cabin cooling position, and the refrigerant passage selector valve 66 is set to the passage through which the refrigerant flows into both the first heat exchanger 63a and the second heat exchanger 63b.

(When Air Conditioner is ON)

As illustrated in FIG. 7, when starting the engine 1, if the air-conditioning state of the cabin 32 is higher than the preset temperature, the cooling demand of the air conditioner 6 becomes ON.

Therefore, the air conditioner 6 is activated. The blower 603 and the compressor 62 are driven at the maximum air amount and output, respectively. Since the refrigerant is distributed to both the first heat exchanger 63a and the second heat exchanger 63b, the cooling demanded amount is set as substantially a middle value of the maximum value. Therefore, the refrigerant is supplied to both the first heat exchanger 63a and the second heat exchanger 63b, the air flows through the air passage 602, and the cooled air blows in the cabin 32. As a result, the cabin 32 is cooled gradually.

By the control of the air conditioner 6, the air amount of the blower 603, the output of the compressor 62, and the cooling demanded amounts of the first heat exchanger 63a and the second heat exchanger 63b decrease according to a temperature drop of the cabin 32. Then, when the cabin 32 reaches the preset temperature, the air amount of the blower 603, the output of the compressor 62, and the cooling demanded amounts of the first heat exchanger 63a and the second heat exchanger 63b are held at respective lower limits.

The water temperature of the engine 1 rises gradually by the start of the engine 1 (timing t1). Then, when a given period passes, the water temperature of the engine 1 reaches a warm-up temperature, and it is held at this temperature (timing t2). Since the temperature of the engine 1 is low during the period from the start of the engine 1 until the engine 1 is warmed up, the cooling demanded amount of the intake air is 0.

That is, when the temperature of the engine 1 is low, the controller 7 (intake air cooling demand determining module 72) does not determine the existence of the cooling demand for the intake air. Then, when the temperature of the engine 1 is high (that is, after the engine 1 is warmed up), it determines the existence of the cooling demand for the intake air.

Even when the temperature of the engine 1 is low (that is, during the start of the engine 1), abnormal combustion suppressing effect can be acquired by the intake air cooling. However, when the temperature of the engine 1 is low, the cooling demand of the air conditioner 6 is high, and the cooling load of the evaporator 63 of the air conditioner 6 is also large. Therefore, at this time, if the intake air is cooled, the cooling of the cabin 32 may be delayed. Both the cooling of the intake air and the cooling of the cabin 32 may not be achieved.

On the other hand, when the temperature of the engine 1 is high (that is, after the warm-up of the engine 1), the cooling demand of the air conditioner 6 is low, and the evaporator 63 of the air conditioner 6 has the remaining capacity. Therefore, even if the intake air is cooled at this moment, there is almost no possibility that the cooling of the cabin 32 is delayed. By utilizing the remaining capacity of the evaporator 63 of the air conditioner 6, both the cooling of the intake air and the cooling of the air inside the cabin 32 can be appropriately achieved at low cost.

When the engine 1 operates in the intake air non-cooling range in the state where the engine 1 is warmed up and the cabin 32 is held at the preset temperature, this state is held. Then, when the engine 1 comes to operate in the intake air cooling range (timing t3), the controller 7 (intake air cooling demand determining module 72) determines that there is the cooling demand of the intake air. As a result, the cooling demanded amount of the intake air increases.

In connection with it, the air passage selector valve 67 is switched to the intake air cooling position so that the intake air can be cooled by the first heat exchanger 63a (the state of the lower figure of FIG. 3). The output of the compressor 62 becomes the maximum, and the refrigerant supply amount increases.

The cooling demanded amounts of the first heat exchanger 63a and the second heat exchanger 63b also increase. Note that the cooling demanded amount of the first heat exchanger 63a is larger than the cooling demanded amount of the second heat exchanger 63b. Accordingly, the distribution of the refrigerant is adjusted by the refrigerant passage selector valve 66. The refrigerant demanded amount of the first heat exchanger 63a is set according to the cooling demanded amount of the intake air. The refrigerant demanded amount of the second heat exchanger 63b is set as an amount required for maintaining the temperature of the cabin 32.

Therefore, the intake air can be cooled effectively. Further, both the cooling of the intake air and the cooling of the air inside the cabin 32 can be appropriately achieved at low cost. Then, when the engine 1 comes to operate in the intake air non-cooling range again (timing t4), it returns to the original state. After that, according to the operating state of the engine 1, the setting is switched corresponding to each of the intake air cooling range and the intake air non-cooling range.

(When Air Conditioner is OFF)

As illustrated in FIG. 8, if the air-conditioning state of the cabin 32 is at the preset temperature when starting the engine 1, the cooling demand of the air conditioner 6 becomes off.

Therefore, although the air conditioner 6 does not operate originally, this intake system 2 performs the pre-cooling control as described above.

The blower 603 is not activated. The cooling demanded amount of the second heat exchanger 63b is 0. The refrigerant passage selector valve 66 is set to the passage so that the refrigerant flows only into the first heat exchanger 63a. The refrigerant is supplied only to the first heat exchanger 63a. However, since the pre-cooling is the purpose, the refrigerant demanded amount is small. The compressor 62 is driven at the minimum output according to the refrigerant demanded amount. Then, it is held in this state.

By the start of the engine 1 (timing t1), the water temperature of the engine 1 rises gradually. At this time, since the temperature of the engine 1 is low, the cooling demanded amount of the intake air is 0. Then, when a given period passes, the water temperature of the engine 1 reaches the warm-up temperature, and it is then held at this temperature (timing t2).

In a state where the engine 1 is held at the warm-up temperature and the cabin 32 is held at the preset temperature, when the engine 1 operates in the intake air non-cooling range, this state is held. Then, when the engine 1 comes to operate in the intake air cooling range (timing t3), the cooling demanded amount of the intake air increases.

In connection with it, the air passage selector valve 67 is switched to the intake air cooling position so that the intake air can be cooled by the first heat exchanger 63a (the state of the lower figure of FIG. 3). At this time, since the first heat exchanger 63a is cooled, the intake air can be cooled promptly.

Since the air conditioner 6 is OFF, the cooling demanded amount of the second heat exchanger 63b is 0. Only for the first heat-exchanger 63a, the cooling demanded amount is increased according to the cooling demanded amount of the intake air. The compressor 62 is driven at the output according to its refrigerant demanded amount (smaller than the maximum output). The output can be suppressed more than when the air conditioner 6 is ON.

Then, when the engine 1 comes to operate in the intake air non-cooling range again (timing t4), it returns to the original state. After that, according to the operating state of the engine 1, the setting is switched corresponding to each of the intake air cooling range and the intake air non-cooling range.
(Heat-Reception Suppressing of Intake Passage)

Even if the temperature of the intake air itself decreases, the intake air receives heat while flowing through the intake passage 4, and increases in the temperature. It becomes easier to receive the heat, particularly as the temperature difference from the surrounding environment becomes larger. Therefore, even if the intake air itself can be cooled, it is difficult to stably reduce the temperature of the intake air when introduced into the combustion chamber 12 to the target temperature described above.

On the other hand, since the intake passage 4 is disposed around the engine 1, it is possible to reduce the temperature of the refrigerant which cools the engine 1 to cool the engine itself. In that case, although it is necessary to raise the heat exchanging efficiency of the radiator 20a, as doing so, the intake air may increase in the temperature due to the hot air from the radiator 20a.

That is, the radiator 20a is disposed on the front side of the engine bay 30, and the engine 1 is disposed rearward of the radiator 20a. Therefore, as illustrated by broken-line arrows in FIGS. 1 and 2, the air (hot air) warmed by the radiator 20a exchanging heat with the refrigerant flows rearward by sending air of the radiator fan 20b.

Since this hot air touches the intake passage 4 (especially, the surge tank 41), the intake air which flows through the intake passage 4 receives heat from the hot air, and increases in the temperature. If the heat exchanging efficiency of the radiator 20a is raised, since the heat flux of the hot air also increases in connection with it, the heat transfer from the hot air to the intake air is stimulated. Therefore, even if the engine itself is cooled, it is difficult to stably reduce the temperature of the intake air when introduced into the combustion chamber 12 to the target temperature described above.

Thus, this intake system 2 is provided with a heat-reception suppressing structure 8 which suppresses the temperature increase of the intake air due to the heat received from the intake passage 4.

In detail, the intake passage cover 80 (one example of a partition in the present disclosure) is provided around the surge tank 41 (an example of an engine proximity passage in the present disclosure) so that the heat received from the intake passage 4 can be suppressed effectively. Further, an air-guiding duct 82 (one example of an air-guiding passage in the present disclosure) is provided so that air caused by the vehicle traveling (traveling air or non-heated air) is guided to a space between the surge tank 41 and the intake passage cover 80 (an intervening space 81), and the air passes through the intervening space 81.

Figure 9:
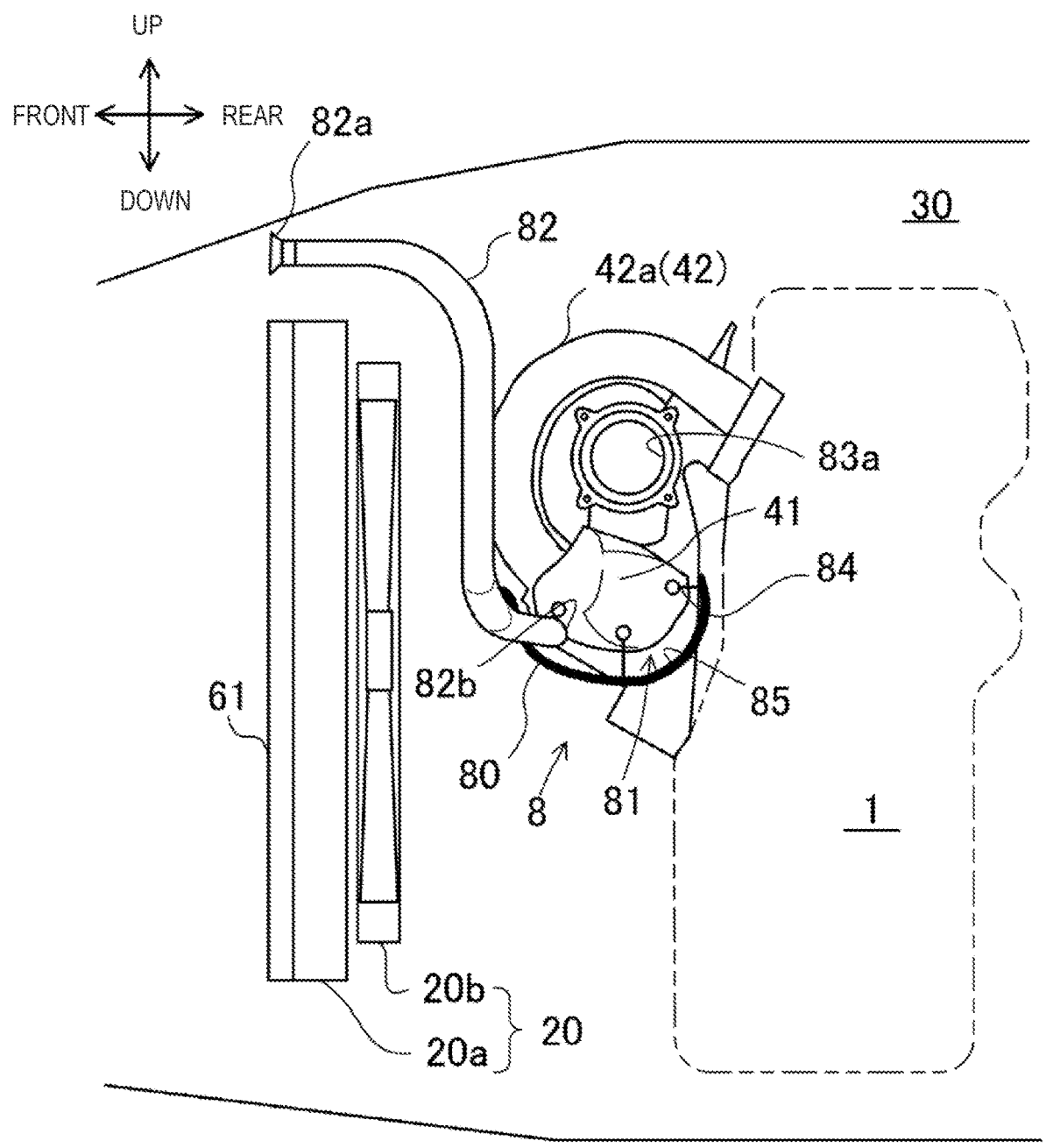
FIG. 9 is a schematic view illustrating one concrete example of a heat-reception suppressing structure.
Figure 10:
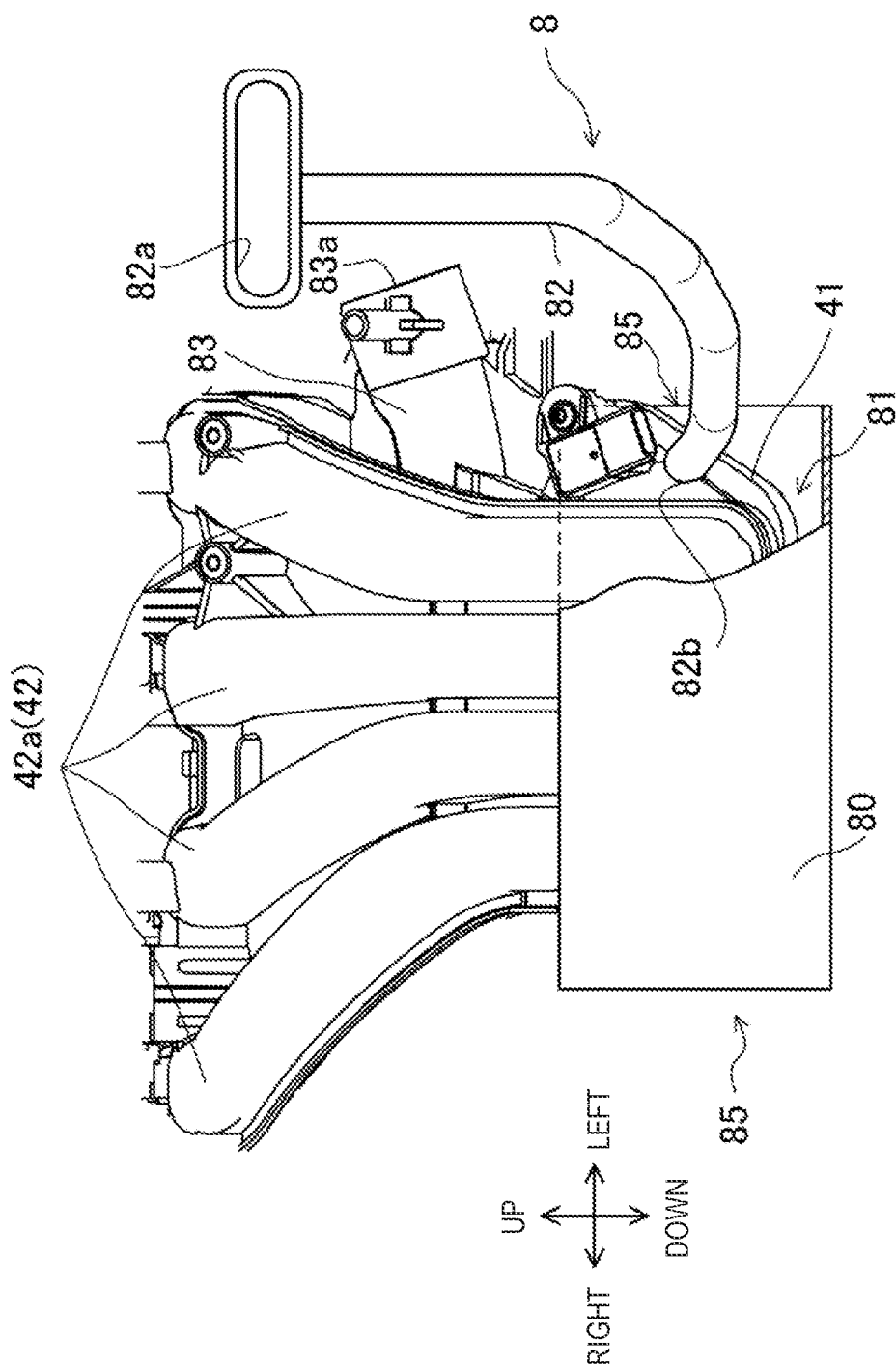
FIG. 10 is a schematic view illustrating the concrete example of the heat-reception suppressing structure.

FIGS. 9 and 10 illustrate a concrete example of the heat-reception suppressing structure 8. As described above, the surge tank 41 and the intake manifold 42 which constitute the intake passage 4 are disposed forward of the engine 1. Further, downstream ends of four independent intake passages (intake distribution passages 42a) of the intake manifold 42 are connected to upstream ends of the intake ports 17, respectively.

The upstream ends of the intake distribution passages 42a are connected to the surge tank 41. Each of the intake distribution passages 42a is curved in an arc shape so that it bulges forward when seen in the left-and-right direction, and the intake distribution passages 42a are formed so that they spread upward from the surge tank 41 disposed therebelow.

In this intake system 2, an intake air introducing part 83 comprised of piping which introduces intake air into the surge tank 41 is provided rearward of the surge tank 41. The air intake introducing part 83 extends in the left-and-right direction in a state where it inclines to be lower as it goes to the right. An intake air inlet 83a opens at the left end of the intake air introducing part 83.

The intake manifold 42 and the surge tank 41 are disposed at a position which opposes to the radiator fan 20b in the front-and-rear direction, and are disposed near and rearward of the radiator unit 20. In detail, the surge tank 41 opposes to a substantially center part of the radiator fan 20b in the front-and-rear direction, and the intake manifold 42 opposes to an upper part of the radiator fan 20b in the front-and-rear direction.

The intake passage cover 80 is comprised of a member having an arc-shaped cross section when seen in the left-and-right direction as illustrated in FIG. 9, and having a rectangular shape when seen in the front-and-rear direction as illustrated in FIG. 10. The intake passage cover 80 is made of material, such as synthetic resin, excellent in thermal insulation.

The intake passage cover 80 is attached to the surge tank 41 from below the surge tank 41. In detail, a plurality of attachment parts are provided to the surge tank 41, and the intake passage cover 80 is attached to the surge tank 41 via a bracket 84 at these attachment parts.

The intake passage cover 80 covers substantially the entire front and rear surfaces of the surge tank 41 with a given gap (intervening space 81) therebetween. Therefore, the front side, the lower side, and the rear side of the surge tank 41 are divided from the engine bay 30 by the intake passage cover 80.

On the other hand, the right side and the left side of the surge tank 41 open to the engine bay 30. Therefore, the intervening space 81 has openings 85 which communicate with the engine bay 30, at the left and right ends. Further, parts between the front and rear ends of the intake passage cover 80 and the surge tank 41 also open to the engine bay 30 through the gap.

The entire surge tank 41 may be covered so that it is substantially sealed by the intake passage cover 80. When the intake passage cover 80 has the shape to cover the surge tank 41 from below, the configuration is simple and the attachment is easy. Further, the present inventors confirmed by a fluid analysis that such a shape can acquire a sufficient heat-reception suppressing effect.

In order to guide the traveling air into the intervening space 81, the air-guiding duct 82 is provided to the heat-reception suppressing structure 8. The air-guiding duct 82 has an external air inlet 82*a* and an air outlet 82*b* at the respective ends. The external air inlet 82*a* is disposed at a position where external air which does not pass through the radiator 20*a* (non-heated air) can be taken in. In this embodiment, the air-guiding duct 82 extends upwardly from near the surge tank 41 so that the external air inlet 82*a* is located above the radiator unit 20.

The air outlet 82*b* is disposed at the left opening 85 among the left and right openings 85 of the intervening space 81. In detail, the air outlet 82*b* is disposed so that external air blown from the air outlet 82*b* is directed to the surface of the left end of the surge tank 41. The downstream end of the air-guiding duct 82 is set to a given angle so as to incline in the front-and-rear direction and the left-and-right direction according to the surge tank 41.

By the external air flowing into the intervening space 81 from the left opening 85 through the air-guiding duct 82, the air of the intervening space 81 flows from the left to the right. Thus, the air is discharged to the engine bay 30 from the right opening 85.

(Heat-Reception Suppressing Effect by Intake Passage Cover and Air-Guiding Duct)

The present inventors examined intercepting the hot air by dividing the circumference of the surge tank 41 with the partition. However, it was found that, although the interception of the hot air prevents the temperature increase due to the direct hit of the hot air, the intake air increases in the temperature by receiving heat from the hot air (heat) which stays inside the partition, and the required temperature increase suppressing effect was not acquired.

Thus, the present inventors examined sending external air to the circumference of the surge tank 41 from the side. Since the radiator unit 20 is located close to the front side of the surge tank 41, a possible air sending direction to the surge tank 41 is substantially limited to the lateral direction (the side) in this case.

The present inventors conducted a fluid analysis about how the flow of the hot air which goes to the circumference of the surge tank 41 from the radiator fan 20*b* changes by sending air to the circumference of the surge tank 41 from the side thereof. The analysis result is illustrated in a simplified fashion in the upper figure of FIG. 11.

Figure 11:
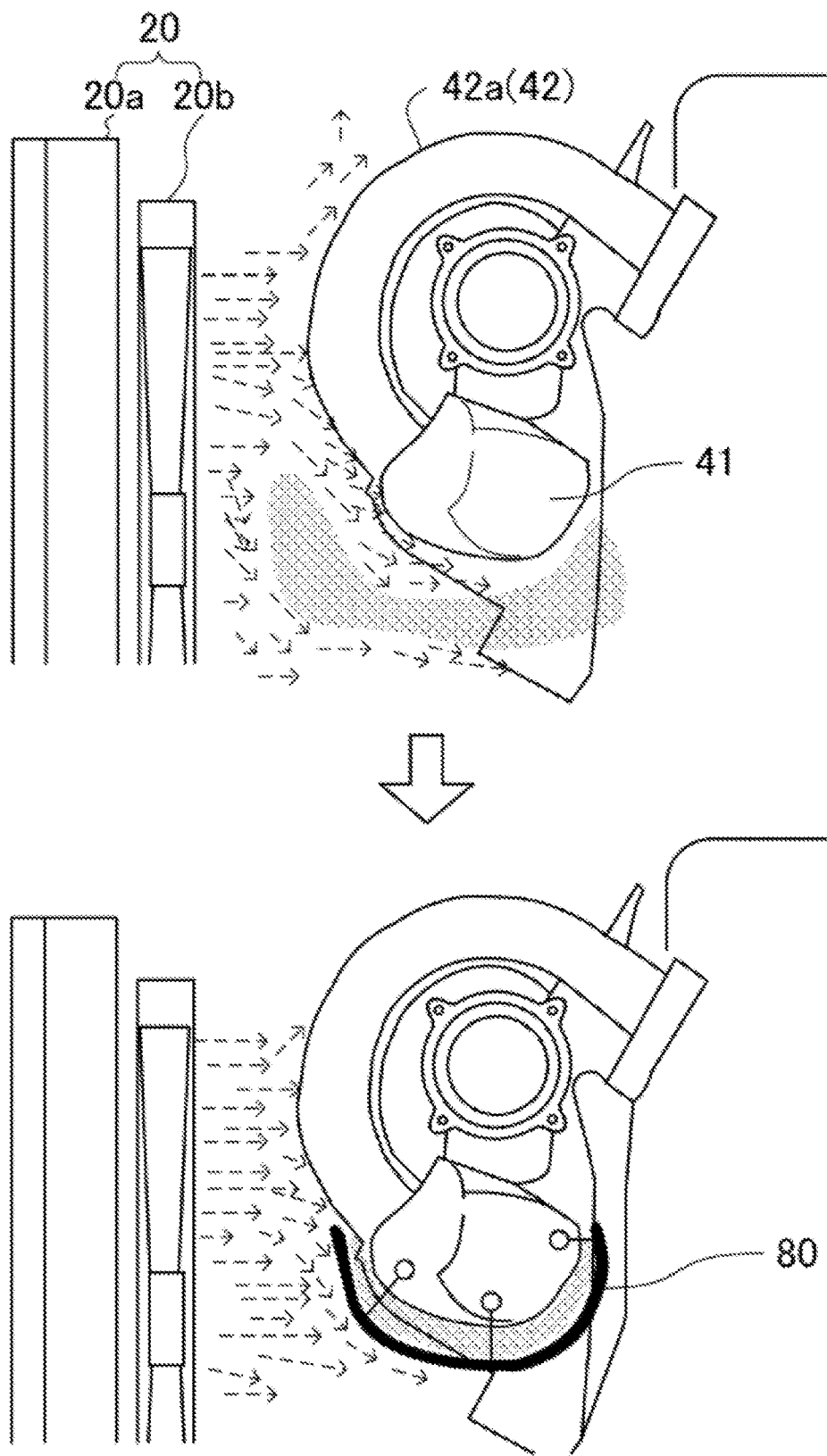
FIG. 11 is a view illustrating a simplified fluid analysis result, where the upper figure illustrates a case in which there is no partition, and the lower figure illustrates a case in which there is a partition.

Broken-line arrows in the upper figure of FIG. 11 indicate the flow of the hot air (heat flux). By activating the radiator fan 20*b*, the heated air produced by the radiator 20*a* becomes strong hot air, and flows rearward to the surge tank 41 and the intake manifold 42. During operation of the engine 1, a large heat flux which goes to the surge tank 41 and its circumference is formed.

On the other hand, a range illustrated by fine dots in the upper figure of FIG. 11 indicates a range where the air flow in the left-and-right direction occurs by sending air. Although the flow in the left-and-right direction is formed around the surge tank 41 by sending air, this flow is weak against the hot air. The strong flow of the hot air contacts the surge tank 41, and diffuses therearound. The sent air turns around the surge tank 41 to the rear side, while being mixed with the hot air, and contacts the surge tank 41.

According to such a fluid analysis, it was found that the contact of the hot air with the surge tank 41 cannot be prevented only by sending the external air to the circumference of the surge tank 41 from the side.

Thus, the present inventors examined this intake system 2 with both measures in combination. The fluid analysis result is illustrated in the lower figure of FIG. 11. The contact of the hot air to the surge tank 41 is prevented by the partition (intake passage cover 80). Further, the air sent between the partition and the surge tank 41 flows in the left-and-right direction, while hardly mixed with the hot air.

Therefore, it was found that the inside of the intake passage cover 80 became lower in the temperature than the outside of the intake passage cover 80, and therefore, it could effectively suppress that the temperature increase of the intake air due to the heat received from the surge tank 41. Based on such an analyses, this intake system 2 adopts the heat-reception suppressing structure 8, which partitions it from the engine bay 30 by providing the intake passage cover 80 around the surge tank 41, and the external air is guided into the intervening space 81 between the surge tank 41 and the intake passage cover 80.

Figure 12:
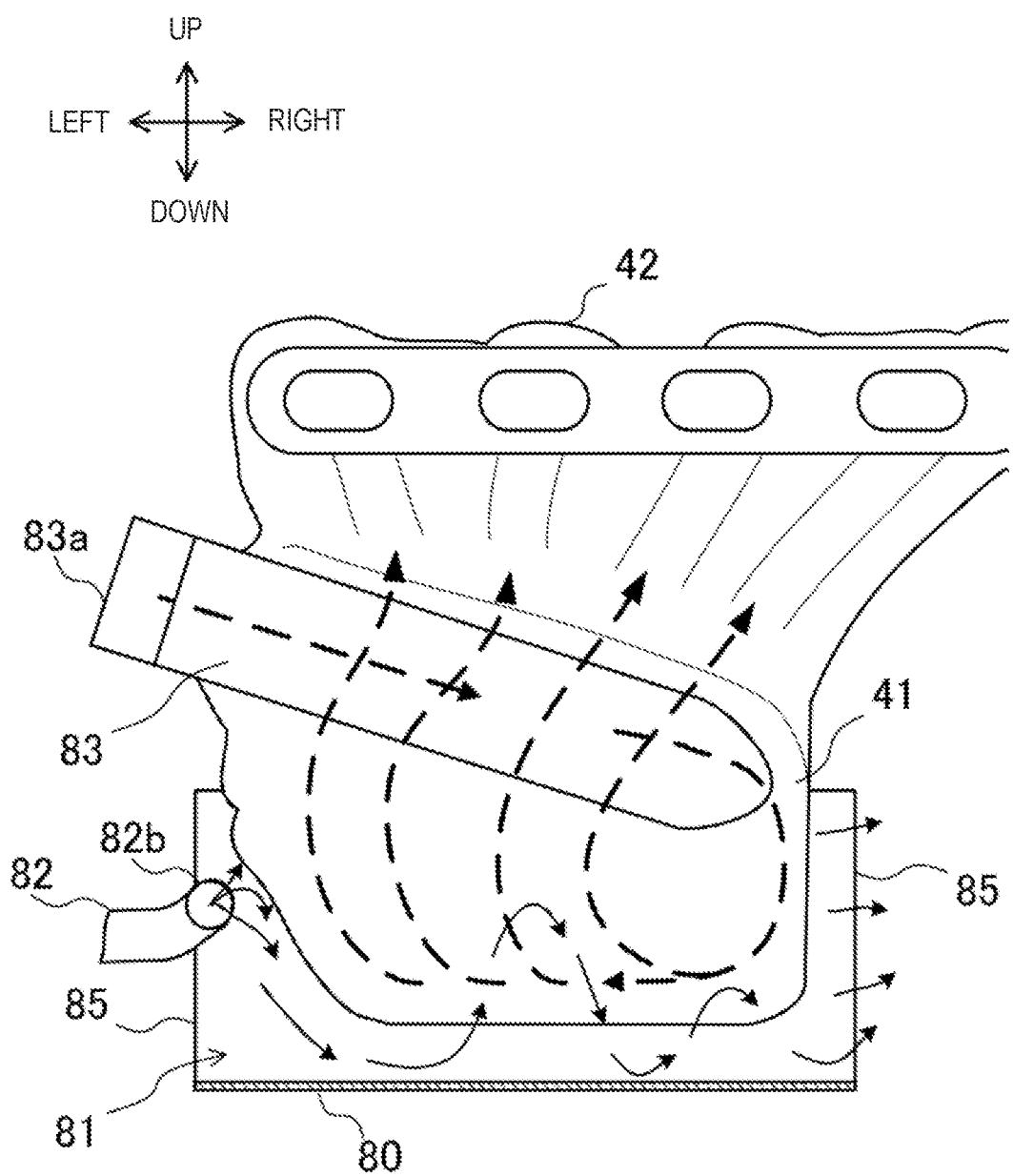
FIG. 12 is a view illustrating a flow of intake air, and a flow of external air by an air-guiding duct.

This intake system 2 is also devised so that the heat-receiving suppressing can be performed more effectively. FIG. 12 illustrates a flow of the intake air and a flow of the external air by the air-guiding duct 82. Broken-line arrows indicate the flow of the intake air. Solid-line arrows indicate the flow of the external air.

The intake air introduced into the intake air introducing part 83 from the intake air inlet 83*a* is guided to the left, after being introduced into the surge tank 41 from its right end part. Then, the intake air introduced into the surge tank 41 is dividedly introduced into the intake distribution passages 42*a*, while flowing to the left.

Further, as described above, the downstream end of the air-guiding duct 82 is disposed at the state where it inclines in the front-and-rear direction and the left-and-right direction so that the external air blown from the air outlet 82*b* is directed to the surface of the left end part of the surge tank 41. Therefore, the external air introduced into the intervening space 81 from the left opening 85 forms not a flow along the wall surface of the surge tank 41 but a flow containing a component which is directed to the wall surface of the surge tank 41.

According to the fluid analysis result, it is confirmed that such a flow is strongly formed especially on the rear side of the surge tank 41. Since the external air becomes easier to contact the surge tank 41 due to such a flow of the external air which is directed to the wall surface of the surge tank 41, the heat-reception of the intake air which flows through the surge tank 41 can be suppressed effectively.

Figure 13:
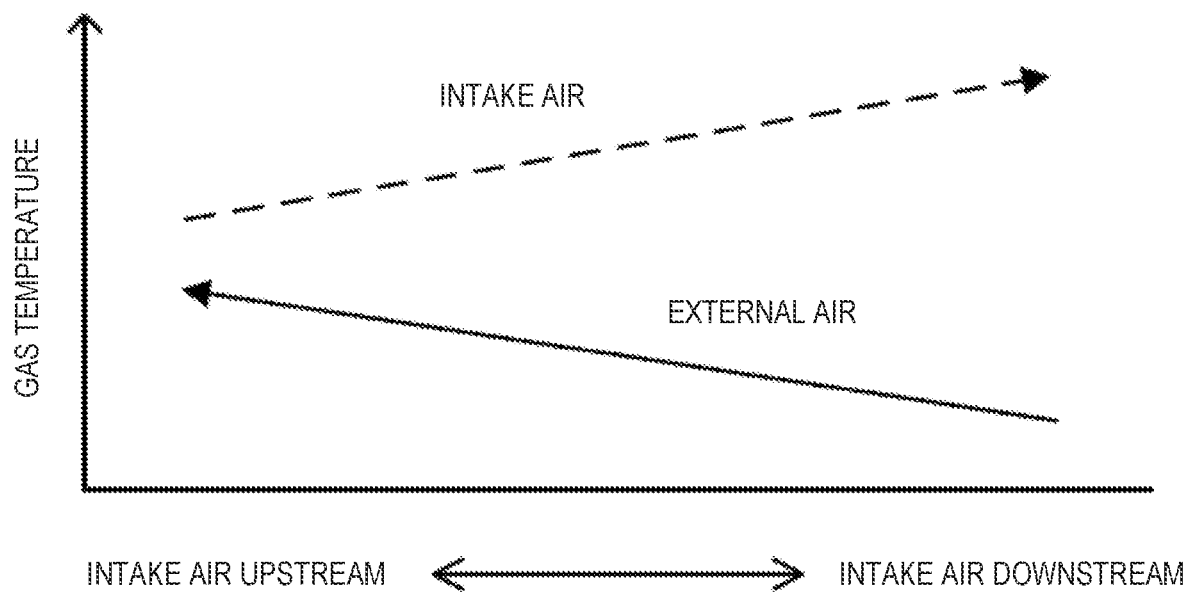
FIG. 13 is a view illustrating a relationship between a flow direction of the intake air and a gas temperature.

Further, the flow direction of the external air inside the intervening space 81 is set to be in the opposite direction from the flow direction of the intake air inside the surge tank 41. That is, the intake air increases in the temperature by the heat-reception as it goes downstream. Therefore, as illustrated by a broken line in FIG. 13, the intake air inside the surge tank 41 becomes relatively high in the temperature at the downstream side (left side) than the upstream side (right side).

Regarding this, this heat-reception suppressing structure 8 is set so that the external air flows inside the intervening space 81 from the left to the right. The external air increases in the temperature by the heat-reception as it goes upstream of the intake air. As the temperature difference between the intake air and the external air becomes larger, the heat transfer through the wall surface of the surge tank 41 is more stimulated so that the heat exchange becomes easier. Therefore, by such setting, it can suppress more effectively the heat-reception of the intake air which flows through the surge tank 41.

This is also advantageous in that the temperature difference of the intake air between the cylinders 10 can be reduced. That is, by such setting, the temperature difference of the intake air in the left-and-right direction inside the surge tank 41 can be reduced. Therefore, the temperature difference of the intake air dividedly introduced into the intake distribution passages 42a can be reduced. The stable combustion can be realized in each cylinder 10, and therefore, the thermal efficiency can be improved.

Note that the disclosed technology is not limited to the embodiment described above. The disclosed technology also encompasses other various configurations. For example, although the embodiment illustrates the gasoline engine, it is also applicable to diesel engines. For a diesel engine, an emission control etc. can be realized by the application of the disclosed technology.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
2 Intake System
3 Automobile
4 Intake Passage
6 Air Conditioner
7 Controller
20 Radiator Unit
44 Temperature Adjustment Passage
48 Intake Air Temperature Control Valve
60 Air Conditioner Body
61 Condenser
62 Compressor
63 Evaporator
63a First Heat Exchanger
63b Second Heat Exchanger
65 Refrigerant Passage
66 Refrigerant Passage Selector Valve
67 Air Passage Selector Valve

What is claimed is:

1. An intake system of an engine, that is mounted on a vehicle where a cabin is air-conditioned by an air conditioner and supplies intake air to a combustion chamber through an intake passage, the air conditioner including an air passage that guides air to the cabin, a compressor that discharges refrigerant, an evaporator that cools the air by exchanging heat with the refrigerant, and a refrigerant passage through which the refrigerant is circulated through the compressor and the evaporator, wherein a heat exchanger of the evaporator is divided into a first heat exchanger and a second heat exchanger that are mutually independent, and the air passage includes a first division passage where the first heat exchanger is disposed, and a second division passage where the second heat exchanger is disposed, wherein the intake system is configured to cool the intake air utilizing part of the air conditioner, the intake system comprising:

a connecting passage that guides first air cooled by passing through the first heat exchanger from the first division passage to the intake passage;
a passage switch that switches a flow direction of the first air to the air passage or the intake passage; and
a controller having a processor configured to execute:
a passage switchover controlling module that controls the passage switch; and
an intake air cooling demand determining module that determines the existence of a cooling demand for the intake air based on an operating state of the engine,
wherein when the controller determines that there is the cooling demand for the intake air, the controller controls the passage switch so that the first air flows into the intake passage through the connecting passage, and when the controller determines that there is no cooling demand for the intake air, the controller controls the passage switch so that the first air flows into the first division passage.

2. The intake system of claim 1, wherein when a temperature of the engine is low, the controller does not determine the existence of the cooling demand for the intake air, and when the temperature of the engine is high, the controller determines the existence of the cooling demand for the intake air.

3. The intake system of claim 2,
wherein the air conditioner is further provided with a blower that sends the air toward the cabin,
wherein the intake system is further provided with a refrigerant switch that switches the flow of the refrigerant to the first heat exchanger and the second heat exchanger,
wherein the controller is further provided with a refrigerant switchover controlling module that is executed by the processor to control the refrigerant switch, and
wherein when cooling of the cabin is demanded, the controller activates both the blower and the compressor so that the refrigerant is supplied to both the first heat exchanger and the second heat exchanger, and when cooling of the cabin is not demanded, the controller suspends the blower and activates the compressor so that the refrigerant is supplied only to the first heat exchanger.

4. The intake system of claim 3, wherein, when an operating range of the engine is divided into three ranges in a load direction including a low-load range, a middle-load range, and a high-load range, the cooling of the intake air is not performed in the low-load range, and the cooling of the intake air is performed in the high-load range.

5. The intake system of claim 4, wherein when the middle-load range is divided into three ranges in an engine speed direction including a low-speed range, a middle-speed range, and a high-speed range, a maximum load in a range where the cooling of the intake air is not performed in the middle-load middle-speed range is larger than maximum loads in ranges where the cooling of the intake air is not performed in the middle-load low-speed range and the middle-load high-speed range.

6. The intake system of claim 5, wherein a range where the cooling of the intake air is performed in the middle-load high-speed range is larger than a range where the cooling of the intake air is performed in the middle-load low-speed range.

7. The intake system of claim 6,
wherein a radiator unit, comprised of a radiator that cools the refrigerant by exchanging heat with air, and a radiator fan that sends the air heated by passing through the radiator rearward, is disposed forward of the engine,
wherein the intake passage includes a given engine proximity passage disposed rearward of the radiator unit,
wherein a partition is provided between the radiator unit and the engine proximity passage to divide therebetween,
wherein an air-guiding passage, that guides non-heated air that does not pass through the radiator into an intervening space between the partition and the engine proximity passage by blowing the non-heated air, is provided, and
wherein the air-guiding passage is disposed so that the blown non-heated air is directed to the engine proximity passage.

8. The intake system of claim 7,
wherein a geometric compression ratio of the engine is 18:1 or higher, and
wherein an upstream part of an intake port of the engine is configured so that a thermal insulation becomes higher than at a downstream part of the intake port.

9. The intake system of claim 1,
wherein the air conditioner is further provided with a blower that sends the air toward the cabin,
wherein the intake system is further provided with a refrigerant switch that switches the flow of the refrigerant to the first heat exchanger and the second heat exchanger,
wherein the controller is further provided with a refrigerant switchover controlling module that is executed by the processor to control the refrigerant switch, and
wherein, when cooling of the cabin is demanded, the controller activates both the blower and the compressor so that the refrigerant is supplied to both the first heat exchanger and the second heat exchanger, and when cooling of the cabin is not demanded, the controller suspends the blower and activates the compressor so that the refrigerant is supplied only to the first heat exchanger.

10. The intake system of claim 1, wherein, when an operating range of the engine is divided into three ranges in a load direction including a low-load range, a middle-load range, and a high-load range, the cooling of the intake air is not performed in the low-load range, and the cooling of the intake air is performed in the high-load range.

11. The intake system of claim 1,
wherein a radiator unit, comprised of a radiator that cools the refrigerant by exchanging heat with air, and a radiator fan that sends the air heated by passing through the radiator rearward, is disposed forward of the engine,
wherein the intake passage includes a given engine proximity passage disposed rearward of the radiator unit,
wherein a partition is provided between the radiator unit and the engine proximity passage to divide therebetween,
wherein an air-guiding passage, that guides non-heated air that does not pass through the radiator into an intervening space between the partition and the engine proximity passage by blowing the non-heated air, is provided, and
wherein the air-guiding passage is disposed so that the blown non-heated air is directed to the engine proximity passage.

12. The intake system of claim 1,
wherein a geometric compression ratio of the engine is 18:1 or higher, and
wherein an upstream part of an intake port of the engine is configured so that a thermal insulation becomes higher than at a downstream part of the intake port.

13. The intake system of claim 2, wherein, when an operating range of the engine is divided into three ranges in a load direction including a low-load range, a middle-load range, and a high-load range, the cooling of the intake air is not performed in the low-load range, and the cooling of the intake air is performed in the high-load range.

14. The intake system of claim 2,
wherein a radiator unit, comprised of a radiator that cools the refrigerant by exchanging heat with air, and a radiator fan that sends the air heated by passing through the radiator rearward, is disposed forward of the engine,
wherein the intake passage includes a given engine proximity passage disposed rearward of the radiator unit,
wherein a partition is provided between the radiator unit and the engine proximity passage to divide therebetween,
wherein an air-guiding passage, that guides non-heated air that does not pass through the radiator into an intervening space between the partition and the engine proximity passage by blowing the non-heated air, is provided, and
wherein the air-guiding passage is disposed so that the blown non-heated air is directed to the engine proximity passage.

15. The intake system of claim 2,
wherein a geometric compression ratio of the engine is 18:1 or higher, and
wherein an upstream part of an intake port of the engine is configured so that a thermal insulation becomes higher than at a downstream part of the intake port.

16. The intake system of claim 9, wherein, when an operating range of the engine is divided into three ranges in a load direction including a low-load range, a middle-load range, and a high-load range, the cooling of the intake air is not performed in the low-load range, and the cooling of the intake air is performed in the high-load range.

17. The intake system of claim 9,
wherein a radiator unit, comprised of a radiator that cools the refrigerant by exchanging heat with air, and a radiator fan that sends the air heated by passing through the radiator rearward, is disposed forward of the engine,
wherein the intake passage includes a given engine proximity passage disposed rearward of the radiator unit,
wherein a partition is provided between the radiator unit and the engine proximity passage to divide therebetween,
wherein an air-guiding passage, that guides non-heated air that does not pass through the radiator into an intervening space between the partition and the engine proximity passage by blowing the non-heated air, is provided, and wherein the air-guiding passage is disposed so that the blown non-heated air is directed to the engine proximity passage.

18. The intake system of claim 9,
wherein a geometric compression ratio of the engine is 18:1 or higher, and
wherein an upstream part of an intake port of the engine is configured so that a thermal insulation becomes higher than at a downstream part of the intake port.

19. The intake system of claim 10, wherein, when the middle-load range is divided into three ranges in an engine speed direction including a low-speed range, a middle-speed range, and a high-speed range, a maximum load in a range where the cooling of the intake air is not performed in the middle-load middle-speed range is larger than maximum loads in ranges where the cooling of the intake air is not performed in the middle-load low-speed range and the middle-load high-speed range.

20. The intake system of claim 19, wherein a range where the cooling of the intake air is performed in the middle-load high-speed range is larger than a range where the cooling of the intake air is performed in the middle-load low-speed range.

* * * * *